(12) United States Patent
Shellhammer et al.

(10) Patent No.: US 9,130,890 B2
(45) Date of Patent: Sep. 8, 2015

(54) FRAME SCHEDULING FOR CHANNEL BONDING

(71) Applicant: QUALCOMM Incorporated, San Diego, CA (US)

(72) Inventors: Stephen Jay Shellhammer, Ramona, CA (US); Patrick Stupar, Nuremberg (DE); Andrea Garavaglia, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/047,766

(22) Filed: Oct. 7, 2013

(65) Prior Publication Data

US 2014/0199070 A1    Jul. 17, 2014

Related U.S. Application Data

(60) Provisional application No. 61/823,311, filed on May 14, 2013, provisional application No. 61/754,367, filed on Jan. 18, 2013, provisional application No. 61/752,880, filed on Jan. 15, 2013.

(51) Int. Cl.
*H04B 10/50* (2013.01)
*H04L 12/911* (2013.01)
(Continued)

(52) U.S. Cl.
CPC ............ *H04L 47/828* (2013.01); *H04L 5/0046* (2013.01); *H04L 25/05* (2013.01); *H04Q 11/0067* (2013.01)

(58) Field of Classification Search
CPC ........... H04J 3/00; H04J 3/16; H04J 14/0254; H04J 14/08; H04J 14/086; H04Q 11/00; H04Q 11/0062; H04Q 11/0071; H04Q 2011/00; H04Q 2011/0062; H04Q 2011/0064; H04Q 11/0067
See application file for complete search history.

(56) References Cited

U.S. PATENT DOCUMENTS

| | | | |
|---|---|---|---|
| 7,961,705 B2 | 6/2011 | Kennedy et al. | |
| 2003/0140173 A1* | 7/2003 | Bione | 709/251 |

(Continued)

FOREIGN PATENT DOCUMENTS

| | | |
|---|---|---|
| EP | 2073465 B1 | 5/2012 |
| WO | 2009064439 A2 | 5/2009 |

OTHER PUBLICATIONS

Hajduczenia M., et al., "Data rate adaptation," IEEE Draft; Hajduczenia_02_0712, IEEE-SA, Piscataway, NJ USA, vol. 802.3.epoc, Jul. 20, 2012, pp. 1-17, XP068021136.
(Continued)

*Primary Examiner* — Darren E Wolf
(74) *Attorney, Agent, or Firm* — Mahamedi Paradice LLP

(57) ABSTRACT

In a method of scheduling frames, a first channel of a plurality of channels is selected for a first frame. The first frame is sent across a media-independent interface to a physical-layer device for transmission on the first channel. A data rate of the media-independent interface is greater than a data rate of the physical-layer device for the first channel. After the first frame is sent across the media-independent interface, subsequent sending of frames for the first channel across the media-independent interface is disabled for a period of time that is based at least in part on rate adaption from the data rate of the media-independent interface to the data rate of the physical-layer device for the first channel.

29 Claims, 19 Drawing Sheets

(51) Int. Cl.
  *H04L 5/00*   (2006.01)
  *H04L 25/05*  (2006.01)
  *H04Q 11/00*  (2006.01)

(56) References Cited

U.S. PATENT DOCUMENTS

| | | | |
|---|---|---|---|
| 2003/0219015 A1* | 11/2003 | Constant Six et al. | 370/389 |
| 2007/0154217 A1* | 7/2007 | Kim et al. | 398/72 |
| 2008/0144622 A1* | 6/2008 | Platnic | 370/390 |
| 2011/0211827 A1 | 9/2011 | Soto et al. | |
| 2013/0104012 A1 | 4/2013 | Barner | |

OTHER PUBLICATIONS

International Search Report and Written Opinion—PCT/US2013/074383—ISA/EPO—Apr. 11, 2014, 8 pages.

"Shellhammer, S. et al., "Channel Bonding and Multiple Modulation Profile", EPON over Coax, IEEE 802.3bn EPoC Task Force, Phoenix, AZ, Jan. 23-25, 2013, 8 pages.".

Shellhammer, S. et al., "Channel Bonding Sub-layer", EPON over Coax IEEE 802.3 Plenary Session, San Antonio, TX, Nov. 12-15, 2012, 28 pages.

* cited by examiner

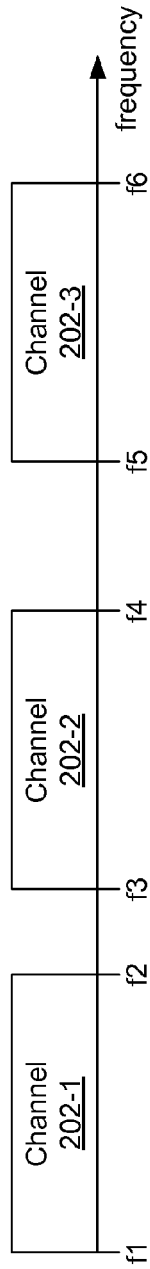
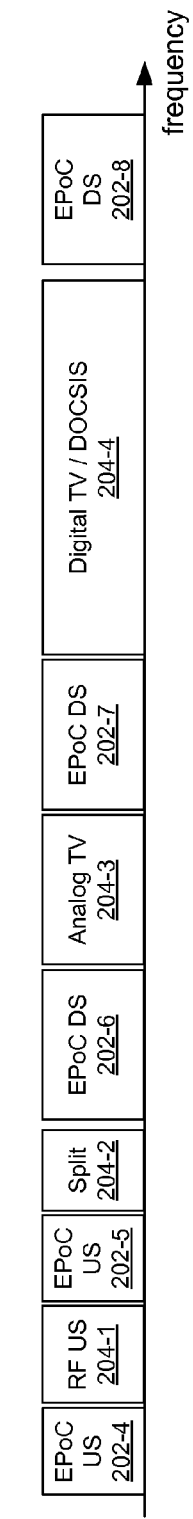

Channel-Bonding Table 500

| | LLID | CBI(s) |
|---|---|---|
| 502 | 5 | 1 |
| 502 | 7 | 1,2 |
| 502 | 12 | 1 |

FIG. 5

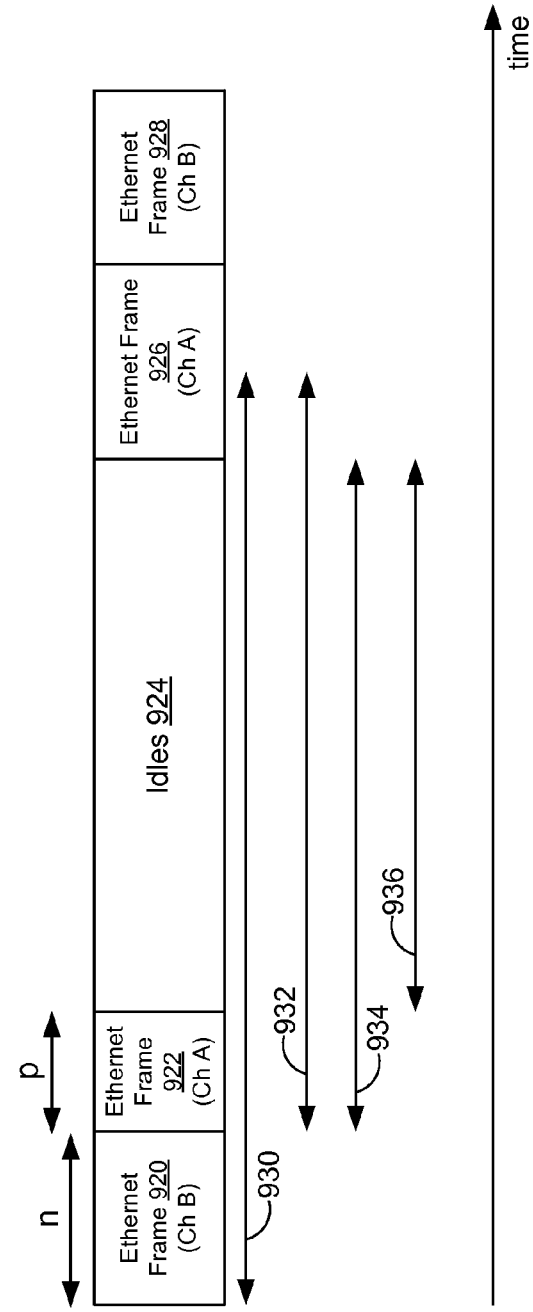

FRAME SCHEDULING FOR CHANNEL BONDING

RELATED APPLICATIONS

This application claims priority to U.S. Provisional Patent Applications No. 61/752,880, titled "Channel Bonding with Multiple Profiles Per Channel," filed Jan. 15, 2013; No. 61/754,367, titled "Channel Bonding with Multiple Profiles Per Channel," filed Jan. 18, 2013; and No. 61/823,311, titled "Frame Scheduling for Channel Bonding," filed May 14, 2013, all of which are hereby incorporated by reference in their entirety.

TECHNICAL FIELD

The present embodiments relate generally to scheduling frames for transmission, and specifically to scheduling frames in communication systems that use multiple channels.

BACKGROUND OF RELATED ART

The Ethernet Passive Optical Networks (EPON) protocol may be extended over coaxial (coax) links in a cable plant. The EPON protocol as implemented over coax links is called EPON Protocol over Coax (EPoC). An EPoC network or similar network may use multiple chunks of frequency spectrum and thus multiple channels for communication. Furthermore, different types of coax network units (CNUs) may be connected to the cable plant, with each type of CNU using a different set of channels. Scheduling transmissions on the different channels presents significant challenges.

SUMMARY

In some embodiments, a method of scheduling frames includes selecting a first channel of a plurality of channels for a first frame and sending the first frame across a media-independent interface to a physical-layer device for transmission on the first channel. A data rate of the media-independent interface is greater than a data rate of the physical-layer device for the first channel. After the first frame is sent across the media-independent interface, subsequent sending of frames for the first channel across the media-independent interface is disabled for a first period of time that is based at least in part on rate adaption from the data rate of the media-independent interface to the data rate of the physical-layer device for the first channel.

In some embodiments, a system includes a physical-layer device to transmit frames on respective channels of a plurality of channels. The physical-layer device has respective data rates for the respective channels. The system also includes a media-independent interface to provide the frames to the physical-layer device, and further includes a scheduler to schedule sending of the frames across the media-independent to the physical-layer device. The scheduler is to select respective channels for respective frames. For each channel, the scheduler is to disable sending of frames for the channel across the media-independent interface for a period of time after a frame for the channel is sent across the media-independent interface. The period of time is based at least in part on rate adaption from a data rate of the media-independent interface to a data rate of the physical-layer device for the channel.

In some embodiments, a non-transitory computer-readable storage medium stores one or more programs configured for execution by one or more processors. The one or more programs include instructions to select a first channel of a plurality of channels for a first frame and instructions to send the first frame across a media-independent interface to a physical-layer device for transmission on the first channel. A data rate of the media-independent interface is greater than a data rate of the physical-layer device for the first channel. The one or more programs also include instructions to disable subsequent sending of frames for the first channel across the media-independent interface for a first period of time after sending the first frame across the media-independent interface. The first period of time is based at least in part on rate adaption from the data rate of the media-independent interface to the data rate of the physical-layer device for the first channel.

BRIEF DESCRIPTION OF THE DRAWINGS

The present embodiments are illustrated by way of example and are not intended to be limited by the figures of the accompanying drawings.

FIGS. 2A and 2B illustrate frequency spectra in accordance with some embodiments.

FIG. 5 illustrates a channel-bonding table implemented in a channel-bonding sublayer in accordance with some embodiments.

FIG. 9A shows the scheduling of frames for a single channel in accordance with some embodiments.

FIG. 9B shows the scheduling of frames for multiple channels in accordance with some embodiments.

Like reference numerals refer to corresponding parts throughout the drawings and specification.

DETAILED DESCRIPTION

Figure 1A:
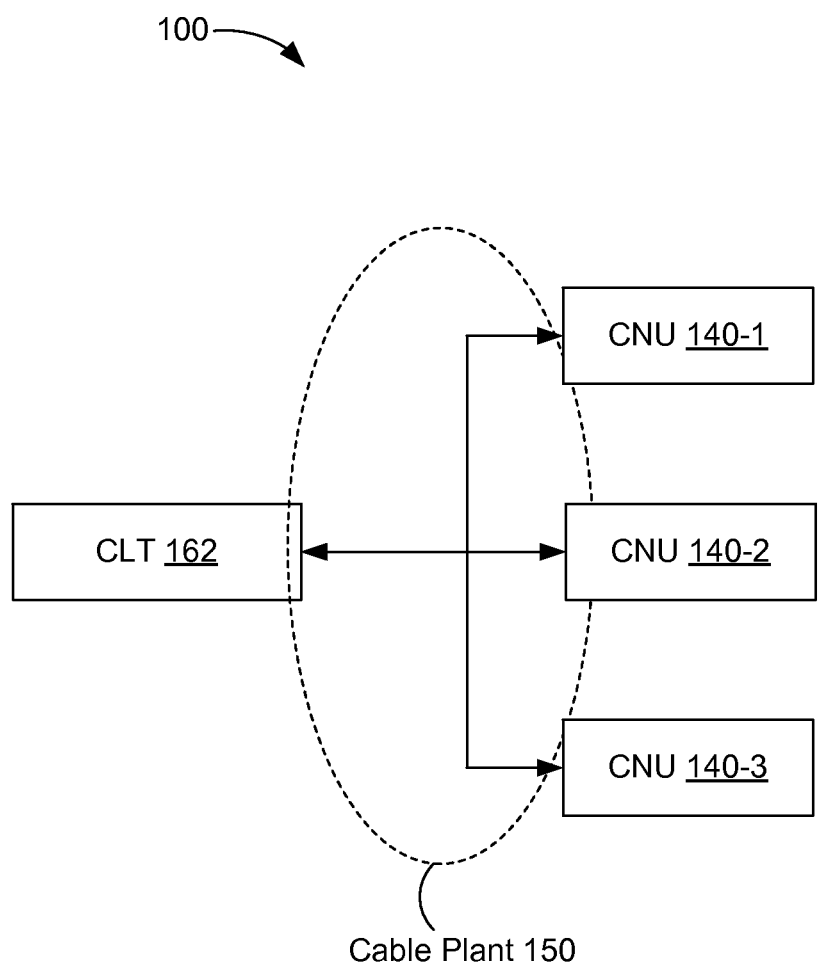
FIG. 1A is a block diagram of a coaxial network in accordance with some embodiments.

In some embodiments, a method of scheduling frames includes selecting a first channel of a plurality of channels for a first frame and sending the first frame across a media-independent interface to a physical-layer device for transmission on the first channel. A data rate of the media-independent interface is greater than a data rate of the physical-layer device for the first channel. After the first frame is sent across the media-independent interface, subsequent sending of frames for the first channel across the media-independent interface is disabled for a first period of time that is based at least in part on rate adaption from the data rate of the media-independent interface to the data rate of the physical-layer device for the first channel.

In some embodiments, a system includes a physical-layer device to transmit frames on respective channels of a plurality of channels. The physical-layer device has respective data rates for the respective channels. The system also includes a media-independent interface to provide the frames to the physical-layer device, and further includes a scheduler to schedule sending of the frames across the media-independent to the physical-layer device. The scheduler is to select respective channels for respective frames. For each channel, the scheduler is to disable sending of frames for the channel across the media-independent interface for a period of time after a frame for the channel is sent across the media-independent interface. The period of time is based at least in part on rate adaption from a data rate of the media-independent interface to a data rate of the physical-layer device for the channel.

In some embodiments, a non-transitory computer-readable storage medium stores one or more programs configured for execution by one or more processors. The one or more programs include instructions to select a first channel of a plurality of channels for a first frame and instructions to send the first frame across a media-independent interface to a physical-layer device for transmission on the first channel. A data rate of the media-independent interface is greater than a data rate of the physical-layer device for the first channel. The one or more programs also include instructions to disable subsequent sending of frames for the first channel across the media-independent interface for a first period of time after sending the first frame across the media-independent interface. The first period of time is based at least in part on rate adaption from the data rate of the media-independent interface to the data rate of the physical-layer device for the first channel.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1A is a block diagram of a coax network 100 (e.g., an EPoC network) in accordance with some embodiments. The network 100 includes a coax line terminal (CLT) 162 coupled to a plurality of coax network units (CNUs) 140-1, 140-2, and 140-3 via coax links. A respective coax link may be a passive coax cable, or may also include one or more amplifiers and/or equalizers. The coax links compose a cable plant 150. In some embodiments, the CLT 162 is located at the headend of the cable plant 150 or within the cable plant 150 and the CNUs 140 are located at the premises of respective users.

The CLT 162 transmits downstream signals to the CNUs 140-1, 140-2, and 140-3 and receives upstream signals from the CNUs 140-1, 140-2, and 140-3. In some embodiments, each CNU 140 (i.e., each of the CNUs 140-1, 140-2, and 140-3) receives every packet transmitted by the CLT 162 and discards packets that are not addressed to it. The CNUs 140-1, 140-2, and 140-3 transmit upstream signals at scheduled times (e.g., in scheduled time slots) specified by the CLT 162. For example, the CLT 162 transmits control messages (e.g., GATE messages) to the CNUs 140-1, 140-2, and 140-3 specifying respective future times at which respective CNUs 140 may transmit upstream signals.

Figure 1B:
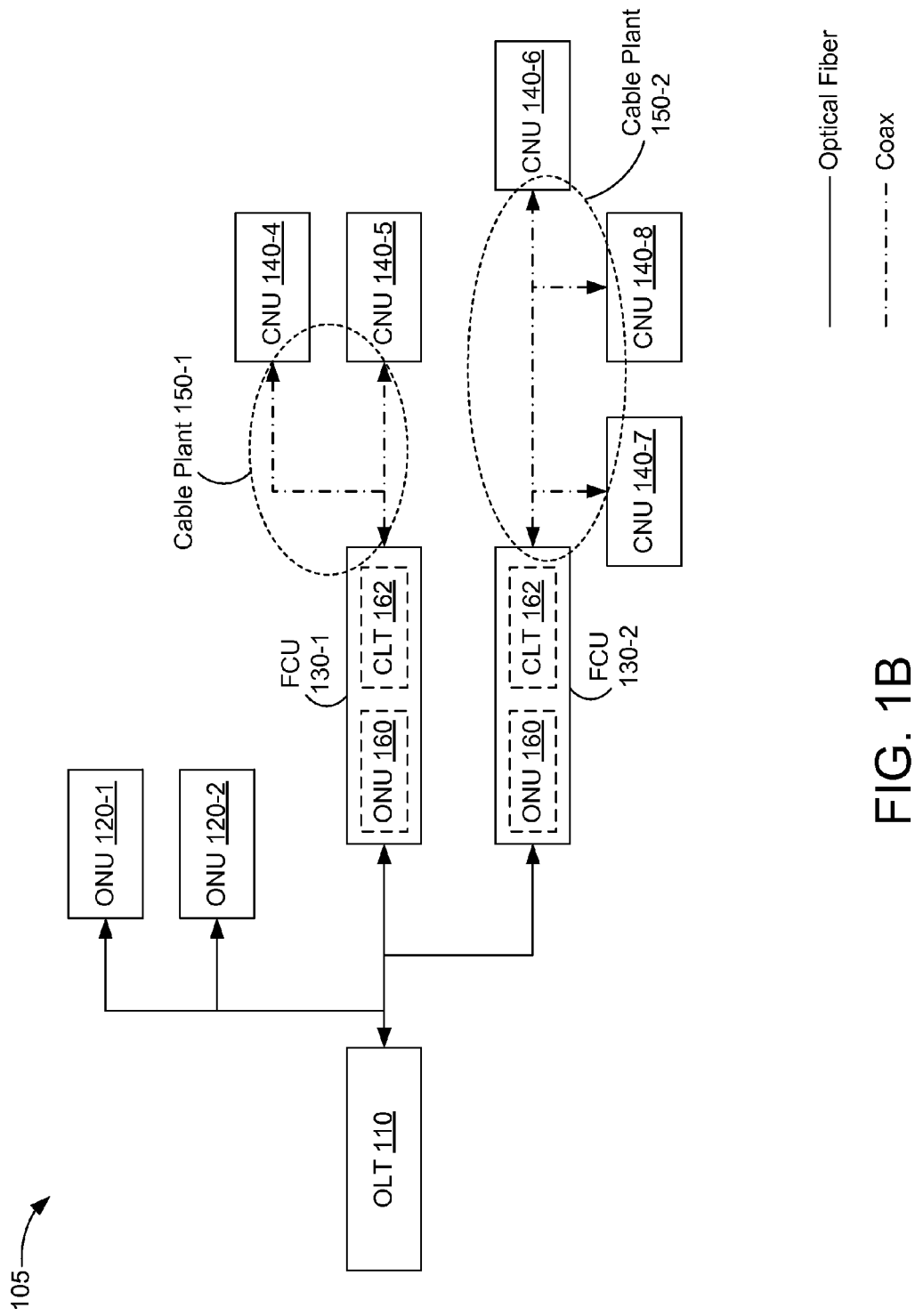
FIG. 1B is a block diagram of a network that includes both optical links and coax links in accordance with some embodiments.

In some embodiments, the CLT 162 is part of a fiber-coax unit (FCU) 130 that is also coupled to an optical line terminal (OLT) 110, as shown in FIG. 1B. FIG. 1B is a block diagram of a network 105 that includes both optical links and coax links in accordance with some embodiments. The network 105 includes an OLT 110 coupled to a plurality of optical network units (ONUs) 120-1 and 120-2 via respective optical fiber links. The OLT 110 also is coupled to a plurality of FCUs 130-1 and 130-2 via respective optical fiber links. (FCUs are sometimes also referred to as optical-coax units or OCUs).

In some embodiments, each FCU 130-1 and 130-2 includes an ONU 160 coupled with a CLT 162. The ONU 160 receives downstream packet transmissions from the OLT 110 and provides them to the CLT 162, which forwards the packets to the CNUs 140 (e.g., CNUs 140-4 and 140-5, or CNUs 140-6 through 140-8) on its cable plant 150 (e.g., cable plant 150-1 or 150-2). In some embodiments, the CLT 162 filters out packets that are not addressed to CNUs 140 on its cable plant 150 and forwards the remaining packets to the CNUs 140 on its cable plant 150. The CLT 162 also receives upstream packet transmissions from CNUs 140 on its cable plant 150 and provides these to the ONU 160, which transmits them to the OLT 110. The ONUs 160 thus receive optical signals from and transmit optical signals to the OLT 110, and the CLTs 162 receive electrical signals from and transmit electrical signals to CNUs 140.

In the example of FIG. 1B, the first FCU 130-1 communicates with CNUs 140-4 and 140-5, and the second FCU 130-2 communicates with CNUs 140-6, 140-7, and 140-8. The coax links coupling the first FCU 130-1 with CNUs 140-4 and 140-5 compose a first cable plant 150-1. The coax links coupling the second FCU 130-2 with CNUs 140-6 through 140-8 compose a second cable plant 150-2. A respective coax link may be a passive coax cable, or alternately may include one or more amplifiers and/or equalizers. In some embodiments, the OLT 110, ONUs 120-1 and 120-2, and optical portions of the FCUs 130-1 and 130-2 are implemented in accordance with the Ethernet Passive Optical Network (EPON) protocol.

In some embodiments, the OLT 110 is located at a network operator's headend, the ONUs 120 and CNUs 140 are located at the premises of respective users, and the FCUs 130 are located at the headends of their respective cable plants 150 or within their respective cable plants 150.

A CLT 162 may communicate with CNUs 140 on its cable plant 150 using multiple channels in respective chunks (or in other words, bands) of a frequency spectrum. FIG. 2A illustrates a frequency spectrum 200 that includes multiple spectrum chunks, each of which serves as a distinct channel 202-1, 202-2, or 202-3 in accordance with some embodiments. For example, each of the channels 202-1, 202-2, and 202-3 is a distinct orthogonal frequency-division multiplexing (OFDM) channel (e.g., a 192 MHz OFDM channel). The channel 202-1 extends from a lower frequency f1 to an upper frequency f2. The channel 202-2 extends from a lower frequency f3 to an upper frequency f4. The channel 202-3 extends from a lower frequency f5 to an upper frequency f6. The channels 202-1, 202-2, and 202-3 thus are non-contiguous: the channels 202-1 and 202-2 are separated by a frequency band between f2 and f3 and the channels 202-2 and 202-3 are separated by a frequency band between f4 and f5. Despite the channels 202-1, 202-2, and 202-3 being non-contiguous, the CLT 162 may transmit on two or more (e.g., all) of the channels 202-1, 202-2, and 202-3, in a process known as channel bonding.

Furthermore, different CNUs 140 to which a CLT 162 is coupled may have different transmission and reception capabilities. The CNUs 140 may include a first group of CNUs 140 (e.g., of a first type or first generation) that can communicate using a first set of the channels 202-1, 202-2, and 202-3 and a second group of CNUs 140 (e.g., of a second type or second generation) that can communicate using a second set of the channels 202-1, 202-2, and 202-3. For example, the CNUs 140-1 and 140-2 (FIG. 1A) may be included in a first group and the CNU 140-3 (FIG. 1A) may be included in a second group; each group may include other CNUs not shown in FIG. 1A for simplicity. The first and second sets of the channels 202-1, 202-2, and 202-3 may overlap. In one example, the first group of CNUs 140 can communicate with the CLT 162 using all three channels 202-1, 202-2, and 202-3, while the second group of CNUs 140 can communicate with the CLT 162 using only a subset of the three channels 202-1, 202-2, and 202-3. In another example, the first group of CNUs 140 can communicate with the CLT 162 using the channels 202-1 and 202-2 and the second group of CNUs 140 can communicate using the channels 202-2 and 202-3. In yet another example, one of the groups of CNUs 140 can communicate with the CLT 162 using only a single one of the channels 202-1, 202-2, and 202-3. Other examples are possible.

FIG. 2B illustrates another frequency spectrum 210 in accordance with some embodiments. The spectrum 210 includes channels 202-4 through 202-8 that a CLT 162 may use for communication with CNUs 140 based for example on EPoC or a similar protocol. The channels 202-4 through 202-8 are non-contiguous: they are separated by spectrum chunks 204-1 through 204-4 that may be used for other services (e.g., legacy services) or may be unused. For example, the spectrum chunk 204-1 is used for radio-frequency (RF) upstream (US) transmissions, the spectrum chunk 204-2 is a split chunk that may act as a guard band, the spectrum chunk 204-3 is used for analog television, and the spectrum chunk 204-4 is used for digital television and for communications using the Data Over Cable Service Interface Specification (DOCSIS), a legacy protocol.

The frequency spectrum 210 illustrates frequency-division duplexing (FDD). Channels 202-4 and 202-5 are dedicated for upstream (US) EPoC transmissions from CNUs 140 to a CLT 162, while channels 202-6, 202-7, and 202-8 are dedicated for downstream (DS) EPoC transmissions from the CLT 162 to CNUs 140. (While the frequency spectrum 210 illustrates FDD, physical-layer channel bonding as described herein may also be performed for time-division duplexing (TDD), in which channels are used for both upstream and downstream transmissions during respective time slots.) Furthermore, as discussed with regard to FIG. 2A, different CNUs 140 may use different channels. For example, a first group of CNUs 140 may be capable of receiving downstream transmissions in all three EPoC DS channels 202-6, 202-7, and 202-8, while a second group of CNUs 140 may be capable of receiving downstream transmissions in the EPoC DS channels 202-6 and 202-7 but not the EPoC DS channel 202-8. In this example, the CLT 162 is able to use all three EPoC DS channels 202-6, 202-7, and 202-8 for communications with the first group of CNUs 140 and is also able to use the EPoC DS channels 202-6 and 202-7 for communications with the second group of CNUs 140. In another example, the CLT 162 uses only one of the EPoC DS channels 202-6, 202-7, and 202-8 for communications with a respective group of CNUs 140.

Figure 3A:
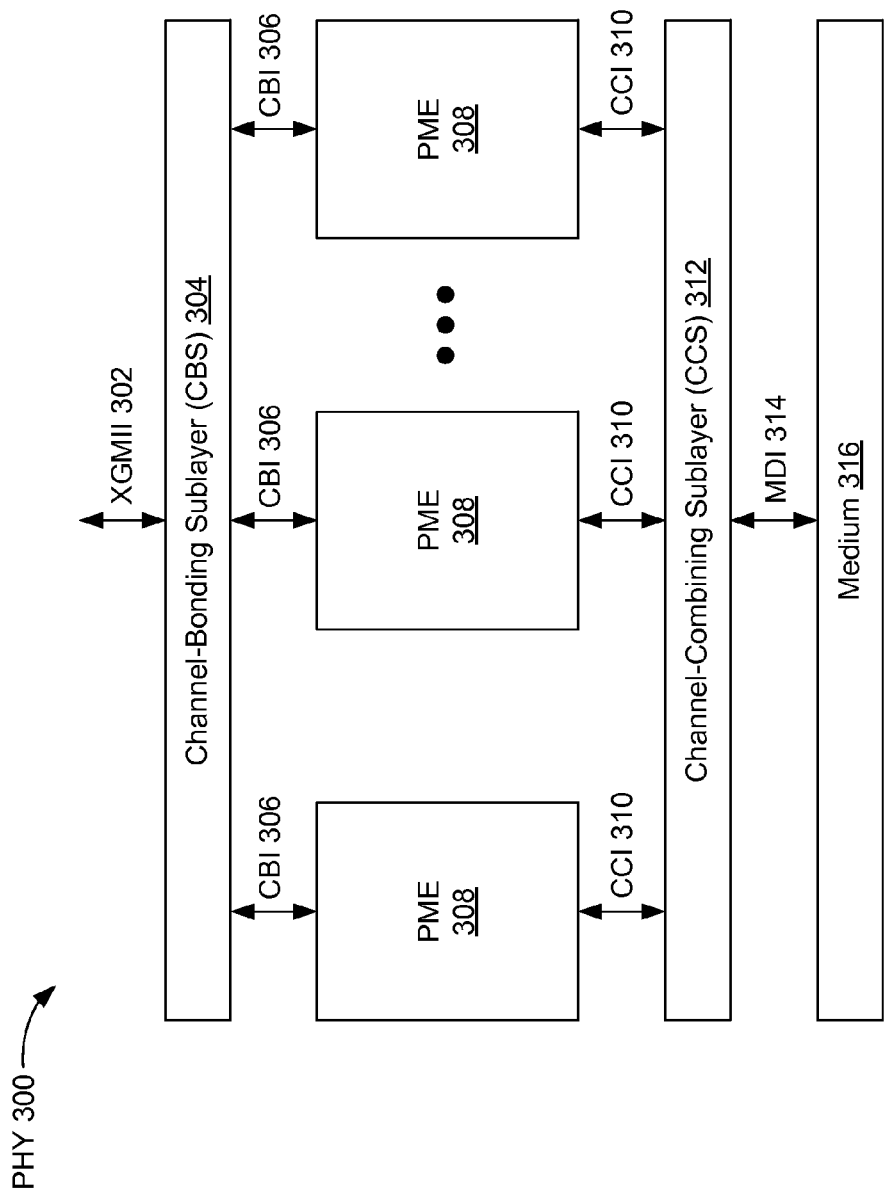
FIGS. 3A and 3B illustrate a physical layer device situated in a network device such as a coax line terminal or coax network unit in accordance with some embodiments.

FIG. 3A illustrates a physical layer (PHY) 300 in accordance with some embodiments. The PHY 300 is situated in a network device such as a CLT 162 or CNU 140. In the PHY 300, a first end of a media-independent interface 302 is coupled to a channel-bonding sublayer (CBS) 304. In some embodiments, the media-independent interface 302 is a 10 Gigabit Media-Independent Interface (XGMII) operating at 10 gigabits per second (i.e., 10 Gbps).

Figure 8:
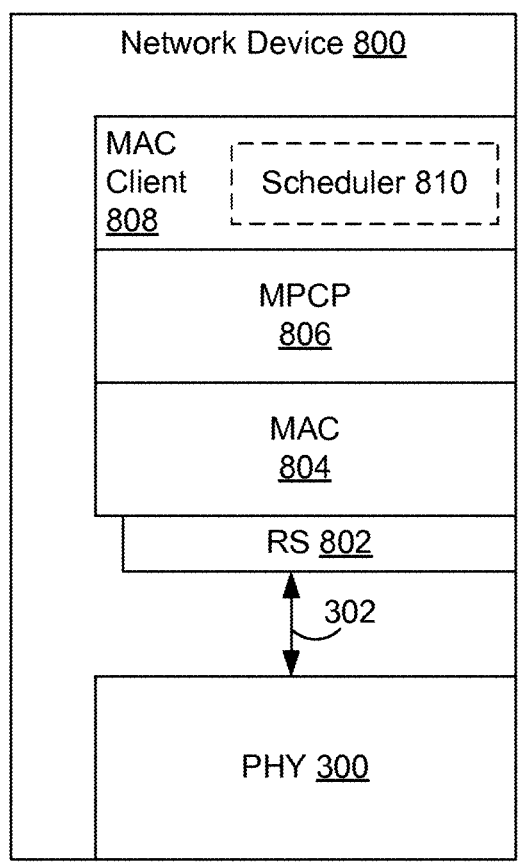
FIG. 8 is a block diagram of protocol layers and sublayers in a network device, such as a coax line terminal or coax network unit, in accordance with some embodiments.

The second end of the media-independent interface 302 is coupled to a reconciliation sublayer (RS) 802, which in turn is coupled to one or more media access control (MAC) sublayers 804 ("the MAC 804"), as shown in FIG. 8 in accordance with some embodiments. FIG. 8 is a block diagram of protocol layers and sublayers in a network device 800, such as a CLT 162 or CNU 140. The MAC 804 is part of a data link layer that may also include a multipoint MAC control protocol (MPCP) sublayer 806; one or more operations, administration, and management (OAM) sublayers (not shown); and one or more MAC clients 808. The one or more MAC clients 808 may include a scheduler 810.

In the PHY 300 (FIG. 3A), the CBS 304 is coupled through a plurality of channel-bonding interfaces (CBIs) 306 to a plurality of respective physical-media entities (PMEs) 308. Each CBI 306 thus couples the CBS 304 to a respective PME 308. In some embodiments, each CBI 306 operates at the same data rate as the media-independent interface 302 (e.g., 10 Gbps); alternatively, each CBI 306 can either operate at the same rate as the media-independent interface 302 or can operate at a lower data rate than the media-independent interface 302 (e.g., 2.5 Gbps, as opposed to an XGMII data rate of 10 Gbps).

Each PME 308 corresponds to a distinct channel (e.g., a distinct one of the channels 202-1, 202-2, and 202-3, FIG. 2A, or a distinct one of the channels 202-6, 202-7, and 202-8, FIG. 2B). Each PME 308 has a respective data rate, which may be lower than the data of the media-independent interface 302. For example, the media-independent interface 302 may have a data rate of 10 Gbps, while the PMEs 308 may have data rates of 1.6 Gbps or less. A first PME 308 may have data rate $R_A$, a second PME 308 may have a data rate $R_B$, a third PME 308 may have a data rate $R_C$, and so on. The data rates $R_A$, $R_B$, $R_C$ (and so on) of different PMEs 308 may vary, depending for example on the modulation and coding scheme (e.g., including the modulation order and coding rate) used by each PME 308 and on the amount of spectrum available in each corresponding channel.

The data rate of each PME 308 may also be referred to as the data rate of the PHY 300 for the corresponding channel.

The PHY 300 thus has a respective data rate (e.g., a different data rate) for each channel, in accordance with some embodiments.

In the transmit direction, the CBS 304 receives frames (e.g., Ethernet frames) from the media-independent interface 302 and directs respective frames to respective CBIs 306, which provide the frames to respective PMEs 308. In some embodiments, the frames are packets. The PMEs 308 generate transmit signals on their respective channels based on the frames. In the receive direction, the PMEs 308 recover frames (which include corresponding packets) from signals received on their respective channels. The CBS 304 receives the recovered frames from the PMEs 308 via the CBIs 306 and multiplexes the recovered frames onto the media-independent interface 302. When no frame is available to be sent across the media-independent interface 302 in a particular direction, idle characters are sent to maintain a constant data rate on the media-independent interface 302.

Each PME 308 is coupled through a respective channel-combining interface (CCI) 310 to a channel-combining sublayer (CCS) 312, which combines transmit signals from the respective PMEs 308 and provides the combined transmit signals through a medium-dependent interface (MDI) 314 to a medium 316 (e.g., a coax link in a cable plant 150, FIGS. 1A-1B). The MDI 314 includes a connector to the medium 316. In some embodiments, the CCS 312 combines radio-frequency (RF) transmit signals from all of the PMEs 308 in the analog domain for transmission, and distributes received RF signals to all of the PMEs 308 in reception. Alternatively, the CCS 312 may perform channel combining in the digital domain (e.g., such that it is implemented within and across the PMDs 338, FIG. 3B).

In some embodiments, the number of channels (e.g., OFDM channels) supported in the PHY 300 is configured using a management data input/output (MDIO) interface.

In some embodiments, the transmit-direction signals used to convey transmit frames across the media-independent interface 302 include well-known XGMII signals TXD<31:0>, TXC<3:0>, and TX_CLK. In some embodiments, the receive-direction signals used to convey recovered packets across the media-independent interface 302 include well-known XGMII signals RXD<31:0>, RXC<3:0>, and RX_CLK. Each group of 32 bits conveyed across the media-independent interface on TXD<31:0> or RXD<31:0> during a given cycle of TX_CLK or RX_CLK (and thus during a given clock cycle) is referred to as a vector. Other media-independent interfaces 302 with other vector sizes are possible.

Figure 3B:
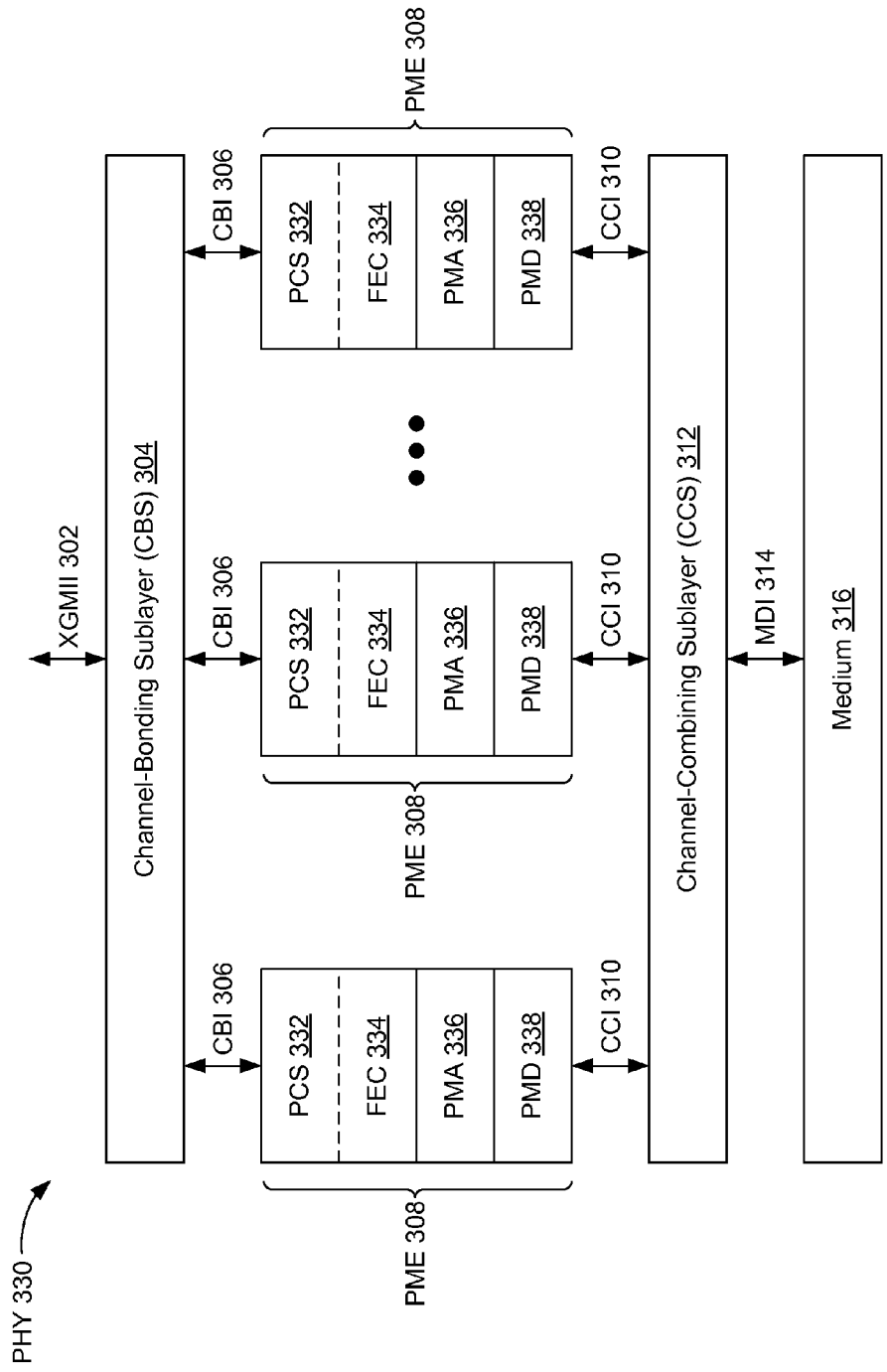

FIG. 3B shows a PHY 330 that is an example of the PHY 300 (FIG. 3A) in accordance with some embodiments. In the PHY 330, each PME 308 includes a physical coding sublayer (PCS) 332, forward-error correction sublayer (FEC) 334, physical medium attachment sublayer (PMA) 336, and physical medium dependent sublayer (PMD) 338 arranged in a stack, for example in accordance with the IEEE 802.3 family of standards. Each PCS 332/FEC 334/PMA 336/PMD 338 stack corresponds to a distinct spectrum chunk (e.g., a distinct one of the channels 202-1, 202-2, and 202-3, FIG. 2A, or a distinct one of the channels 202-6, 202-7, and 202-8, FIG. 2B) and thus to a distinct channel. Each PCS 332 is coupled through a respective CBI 306 to the media-independent interface 302. Each PMD 338 is coupled through a respective CCI 310 to the CCS 312.

The FEC sublayer 334 inserts FEC parity bits into frames that are received from the media-independent interface 302 for transmission (i.e., in the transmit direction). The PCS 332 deletes corresponding idle characters that are sent across the media-independent interface 302 to the PHY 330 to reserve space for the FEC parity bits in the frames.

Figure 3C:
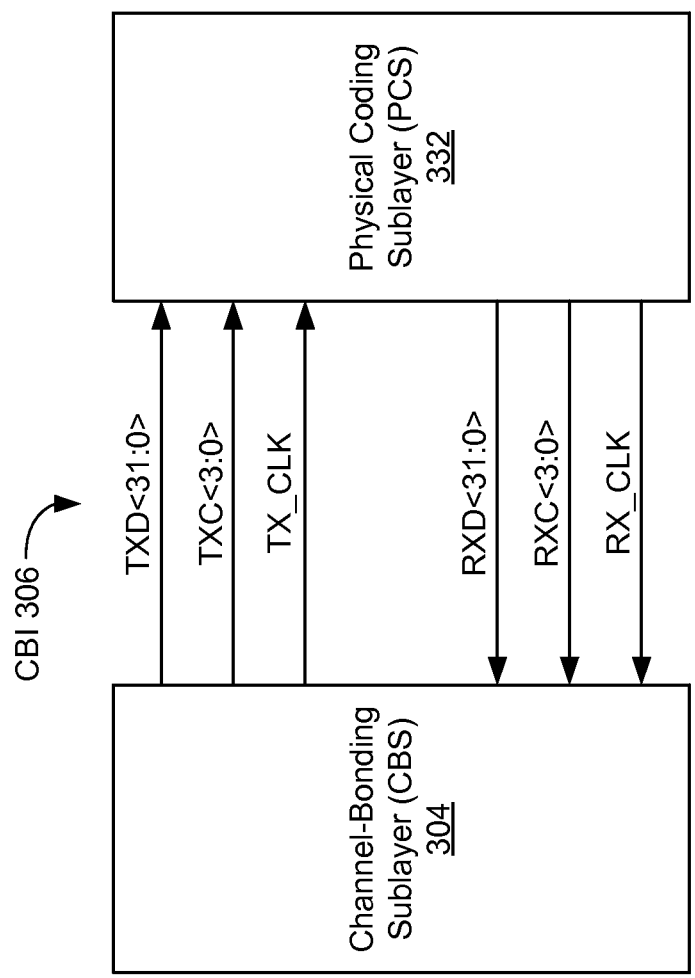
FIG. 3C is a block diagram illustrating signals on a channel-bonding interface of FIG. 3A or 3B in accordance with some embodiments.

FIG. 3C is a block diagram illustrating signals on a CBI 306 that couples the CBS 304 to a PCS 332, in accordance with some embodiments. In the example of FIG. 3C, the transmit and receive signals for the CBI 306 are the same as the transmit and receive signals for an XGMII implementation of the media-independent interface 302: TXD<31:0>, TXC<3:0>, and TX_CLK for the transmit direction and RXD<31:0>, RXC<3:0>, and RX_CLK for the receive direction. When no frame is available to be sent across a respective CBI 306 in a particular direction, idle characters are sent to maintain a constant data rate.

Figure 3D:
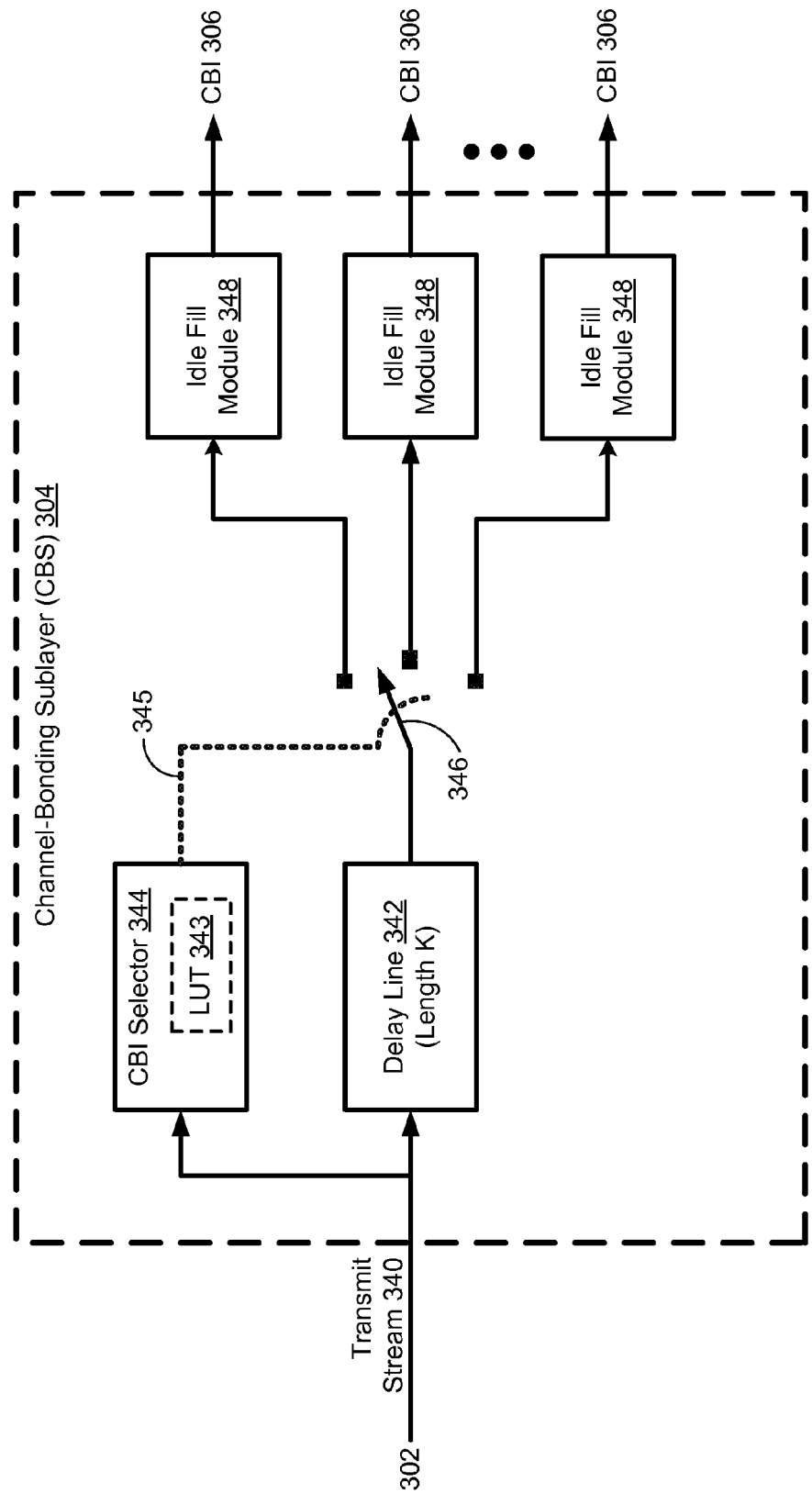
FIGS. 3D and 3E are block diagrams illustrating transmit-direction circuitry for the channel-bonding sublayer of FIG. 3A or 3B in accordance with some embodiments.

FIG. 3D is a block diagram illustrating transmit-direction circuitry for the CBS 304 in accordance with some embodiments. A transmit stream 340, which includes frames and idle characters, is received from the media-independent interface 302 and provided to a delay line 342 of fixed length K (e.g., where K is a specified number of clock cycles) and to a CBI selector 344. In some embodiments, the width of the delay line 342 matches the width of the media-independent interface 302. For example, the delay line 342 and the media-independent interface 302 are both 32 bits wide. In some embodiments, the length K is configurable (e.g., may be programmed through an MDIO interface). A commutator 346 acts as a switch that selectively couples the delay line 342 to respective idle fill modules 348, each of which provides its output to a respective CBI 306.

The CBI selector 344 implements a CBI selection function that parses the transmit stream 340. For each respective frame in the transmit stream 340, the CBI selector 344 selects the CBI 306 to which to direct the frame and, after a delay of K clock cycles (corresponding to the length of delay line 342), instructs the commutator 346 (e.g., using a commutator control signal 345) to couple the delay line 342 to the corresponding idle fill module 348. In some embodiments, the CBI selection function is based on a logical link identifier (LLID) embedded in a respective frame (e.g., in the preamble). For example, the CBI selector 344 extracts the LLID from a frame and performs a look-up in a look-up table (LUT) 343 (e.g., the channel-bonding table 500, FIG. 5) that maps LLIDs to CBIs 306. The commutator 346 stays in a particular position until the CBI selector 344 instructs it to change to a new position. When an idle fill module 348 receives a frame from the commutator 346, it transmits the frame onto the corresponding CBI 306 to which it is coupled. Otherwise, the idle fill module 348 transmits idle characters onto the corresponding CBI 306.

Figure 3E:
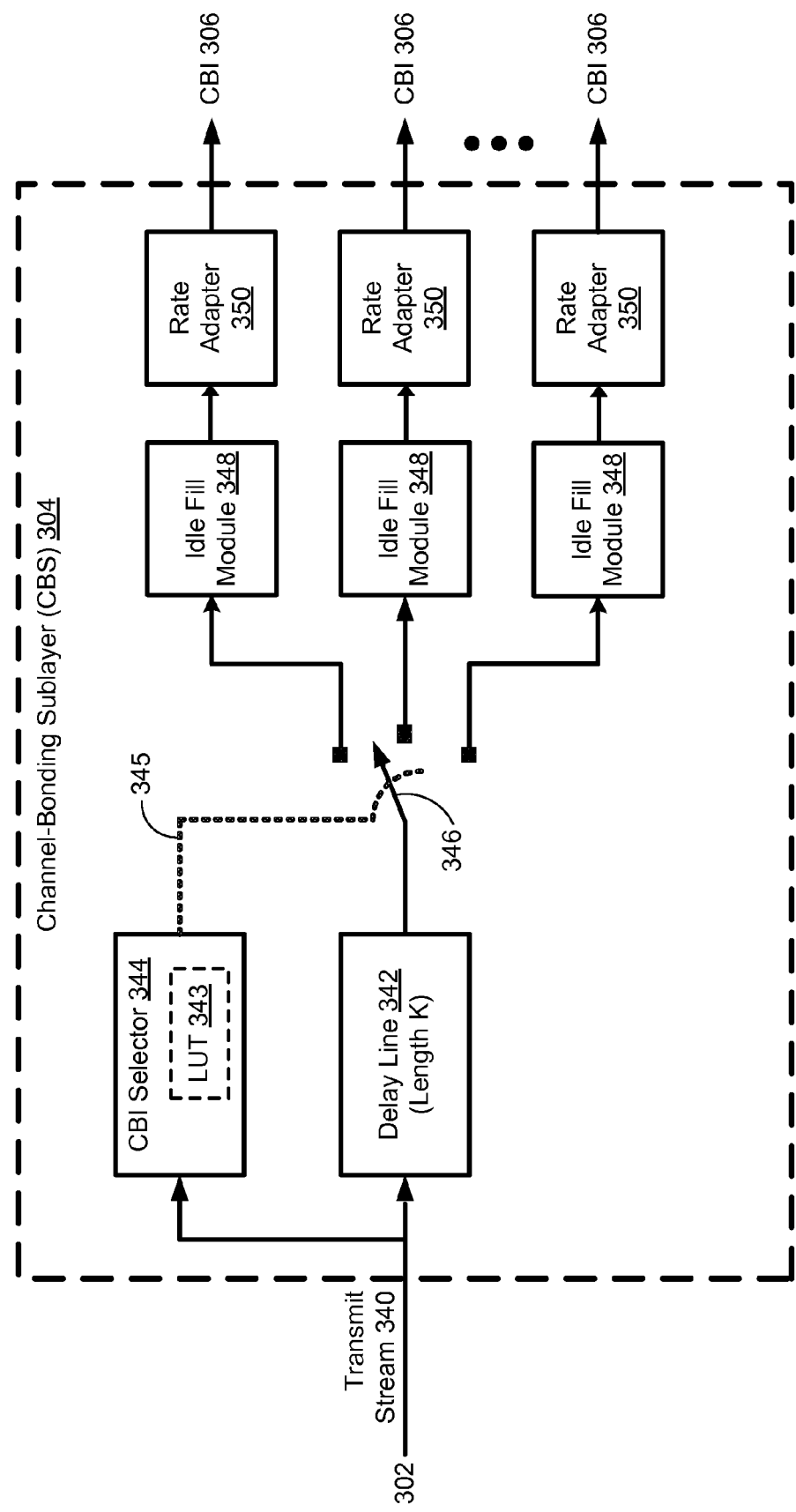

FIG. 3E is another block diagram illustrating transmit-direction circuitry for the CBS 304 in accordance with some embodiments. The transmit-direction circuitry of FIG. 3E may be used in embodiments in which the CBIs 306 have data rates that are different from (e.g., lower than) the data rate of the media-independent interface 302. Each idle fill module 348 provides its output to a respective rate adapter 350 that adapts the output to the data rate of the CBI 306. Each rate adapter 350 is thus coupled between its corresponding idle fill module 348 and CBI 306.

Figure 4:
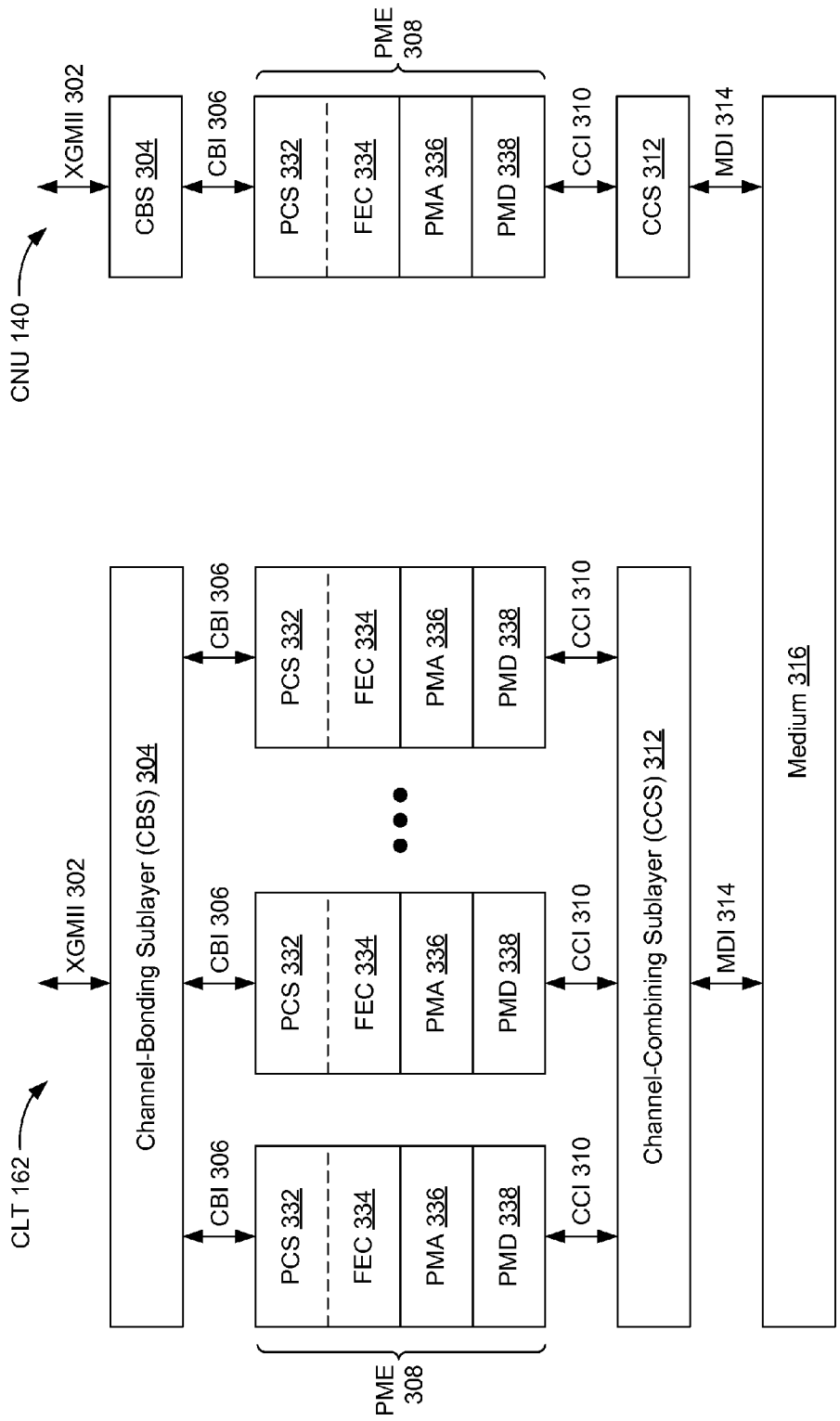
FIG. 4 illustrates an example of physical-layer protocol stacks in a coax line terminal and a coax network unit in accordance with some embodiments.

FIG. 4 illustrates an example of physical-layer protocol stacks in a CLT 162 and a CNU 140 (FIGS. 1A-1B) in accordance with some embodiments. The CLT 162 is coupled to the CNU 140 by a medium 316 (e.g., a coax link). In this example, the CLT 162 supports a plurality of OFDM channels (e.g., channels 202-1, 202-2, and 202-3, FIG. 2A, or 202-6, 202-7, and 202-8, FIG. 2B). The protocol stack for the CLT 162 is an example of the PHY 330 (FIG. 3B), with a different PME 308 (e.g., a different PCS 332/FEC 334/PMA 336/PMD 338 stack) for each channel. The CNU 140 in this example, however, only supports a single OFDM channel (e.g., one of the channels 202-1, 202-2, and 202-3, FIG. 2A, or 202-6, 202-7, and 202-8, FIG. 2B) and only has a single corresponding PME 308 (e.g., a single PCS 332/FEC 334/PMA 336/ PMD 338 stack). When the CBS 304 in the CLT 162 receives a frame to be transmitted to the CNU 140, it directs the frame to the CBI 306 in the CLT 162 corresponding to the channel that the CNU 140 supports. The CBI 306 provides the frame to the PME 308 in the CLT 162 for this channel, which generates a signal that the CCS 312 in the CLT 162 transmits through the MDI 314 onto the medium 316. The CCS 312 of the CNU 140 receives this signal and provides it to the PME 308 (e.g., the PCS 332/FEC 334/PMA 336/PMD 338 stack) in the CNU 140, which recovers the frame and forwards the recovered frame to the CBS 304 through the CBI 306. The CBS 304 in the CNU 140 forwards the recovered frame to a MAC sublayer (not shown) in the CNU 140 through the media-independent interface 302 and a reconciliation sublayer (not shown).

When the CBS 304 in the CNU 140 receives a frame from the media-independent interface 302 for transmission to the CLT 162, it provides the packet to its PME 308 (e.g., its PCS 332/FEC 334/PMA 336/PMD 338 stack) through its CBI 306. The PME 308 generates a signal that the CCS 312 in the CNU 140 transmits through the MDI 314 onto the medium 316. The CCS 312 of the CLT 162 receives this signal, performs filtering to select the channel, and provides the signal to the corresponding PME 308 (e.g., the corresponding PCS 332/FEC 334/PMA 336/PMD 338 stack), which recovers the frame and forwards it to the CBS 304 in the CLT 162 through the CBI 306. Alternatively, the signal is provided to all of the PMEs 308; all of the PMEs 308 except the PME 308 corresponding to the channel on which the signal was transmitted filter out the signal. For example, the signal is provided to all of the PMDs 338; all of the PMDs 338 except the PMD 338 corresponding to the channel on which the signal was transmitted filter out the signal. The CBS 304 in the CLT 162 forwards the recovered frame to a MAC sublayer (not shown) in the CLT 162 through the media-independent interface 302 and a reconciliation sublayer (not shown).

In some embodiments, for a transmission from the CLT 162 to a CNU 140 that supports multiple channels for reception, the CBS 304 of the CLT 162 selects one of these channels and directs a frame addressed to the CNU 140 to the CBI 306 in the CLT 162 that corresponds to the selected channel. Similarly, if the CNU 140 supports multiple channels for transmission, the CBS 304 of the CNU 140 selects one of the channels and directs a frame to be transmitted upstream to the CLT 162 to the CBI 306 (and thus the PME 308) in the CNU 140 that corresponds to the selected channel. In some embodiments, the CLT 162 supports each channel supported by every CNU 140 on its cable plant 150.

FIG. 5 illustrates a channel-bonding table 500 implemented in the CBS 304 in accordance with some embodiments. The channel-bonding table 500 may be implemented in the CBI selector 344 (FIG. 3D or 3E) as an example of a LUT 343 (FIG. 3D or 3E). The channel-bonding table 500 maps LLIDs to CBIs 306. The LLIDs in the channel-bonding table 500 may include LLIDs for specific CNUs 140, as specified in unicast frames, and/or LLIDs for broadcast and/ or multicast groups, as specified in broadcast and/or multicast frames. (The CNUs 140 on a cable plant 150 may be grouped into a plurality of multicast groups, whereas all of the CNUs 140 on the cable plant 150 are included in a single broadcast group.) Each entry 502 in the channel-bonding table 500 includes an LLID field 504 and a CBI field 506, and thereby maps an LLID value to one or more CBIs 306. For example, an LLID with the value '5' is mapped to a first CBI 306, an LLID with the value '7' is mapped to the first CBI 306 and also to a second CBI 306, and an LLID with the value '12' is mapped to the first CBI 306. An LLID may be mapped to two CBIs 306 if the receiving device supports the two respective channels that correspond to the two CBIs 306. In some embodiments, when the CBI selector 344 (FIG. 3D or 3E) determines that an LLID maps to two (or more) CBIs 306, it selects one of the CBIs 306 (e.g., at random, based on a designation in the channel-bonding table 500 of one of the CBIs 306 as a primary CBI 306, or based on a designation contained in the packet as determined by a scheduler).

In some embodiments, the channel-bonding table 500 is configured and updated using an MDIO interface.

In some embodiments, as an alternative to using the channel-bonding table 500, frames received at the CBS 304 from the media-independent interface 302 may have a tag embedded in them specifying the CBI 306 to be used (e.g., as determined by the scheduler 810, FIG. 8, below). The CBI selector 344 (FIG. 3D or 3E) extracts this tag and positions the commutator 346 (FIG. 3D or 3E) accordingly.

Figure 6A:
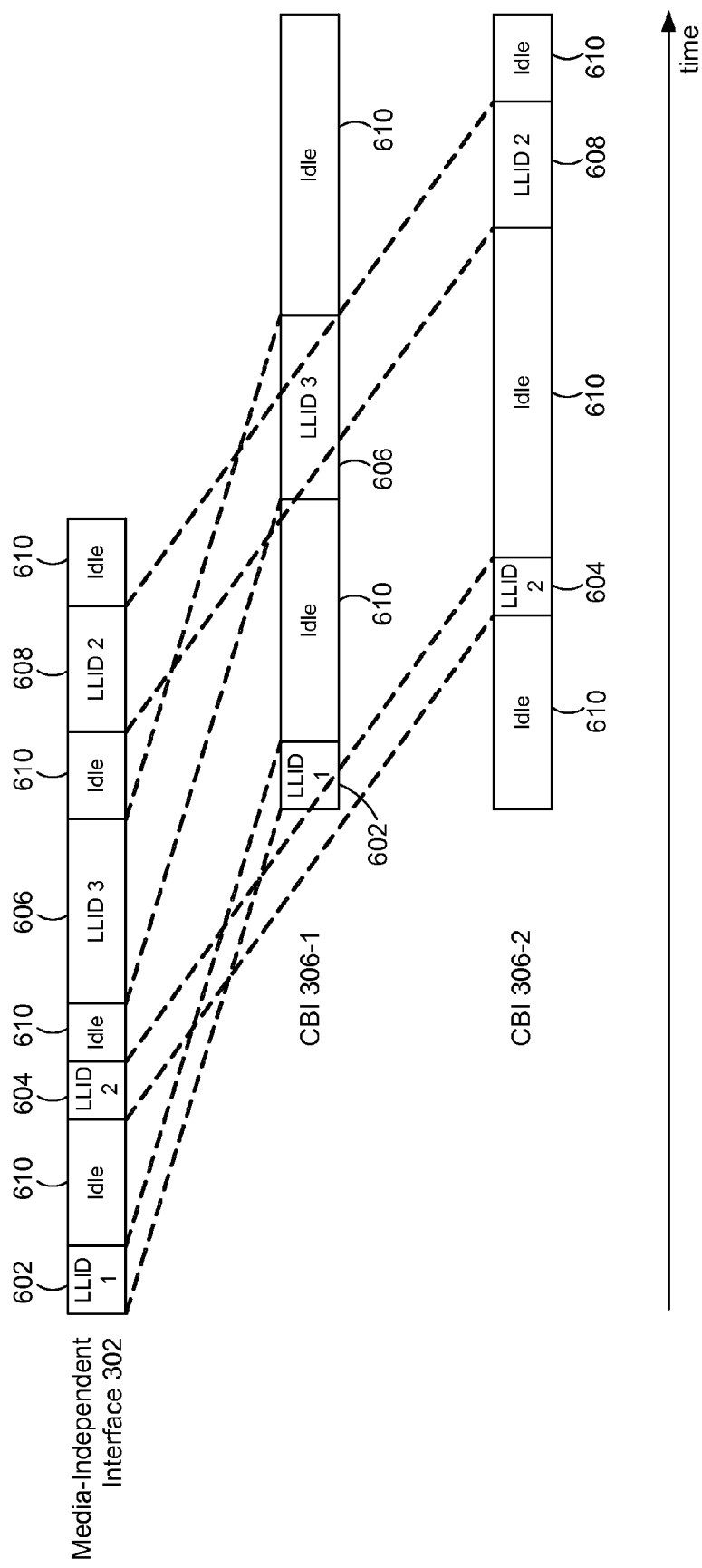
FIG. 6A illustrates a fixed delay through a channel-bonding sublayer for transmission in accordance with some embodiments.

In some embodiments, there is a (substantially) fixed delay through the CBS 304. FIG. 6A illustrates the fixed delay through the CBS 304 for transmission in accordance with some embodiments, by illustrating transmit streams for the media-independent interface 302 and two CBIs 306-1 and 306-2. The media-independent interface 302 provides frames 602, 604, 606, and 608 to the CBS 304. Each of the frames 602, 604, 606, and 608 includes an LLID (e.g., embedded in the preamble): LLID 1 for frame 602, LLID 2 for frame 604, LLID 3 for frame 606, and LLID 2 for frame 608. Based on the LLIDs (e.g., using the channel-bonding table 500, FIG. 5), the CBS 304 directs each of the frames 602, 604, 606, and 608 to one of the CBIs 306-1 and 306-2. Frames 602 and 606 are directed to the first CBI 306-1 and frames 604 and 608 are directed to the second CBI 306-2. The time between the receipt of each frame 602, 604, 606, and 608 from the media-independent interface 302 to transmission of each frame 602, 604, 606, and 608 on the first CBI 306-1 or second CBI 306-2 is (substantially) fixed, thus showing that the transmission delay through the CBS 304 is fixed (e.g., to within a degree provided by the transmit-direction circuitry of FIG. 3D or 3E).

As FIG. 6A shows, the media-independent interface 302 and the CBIs 306-1 and 306-2 send idle characters 610 in the transmit direction when no packets are available.

Figure 6B:
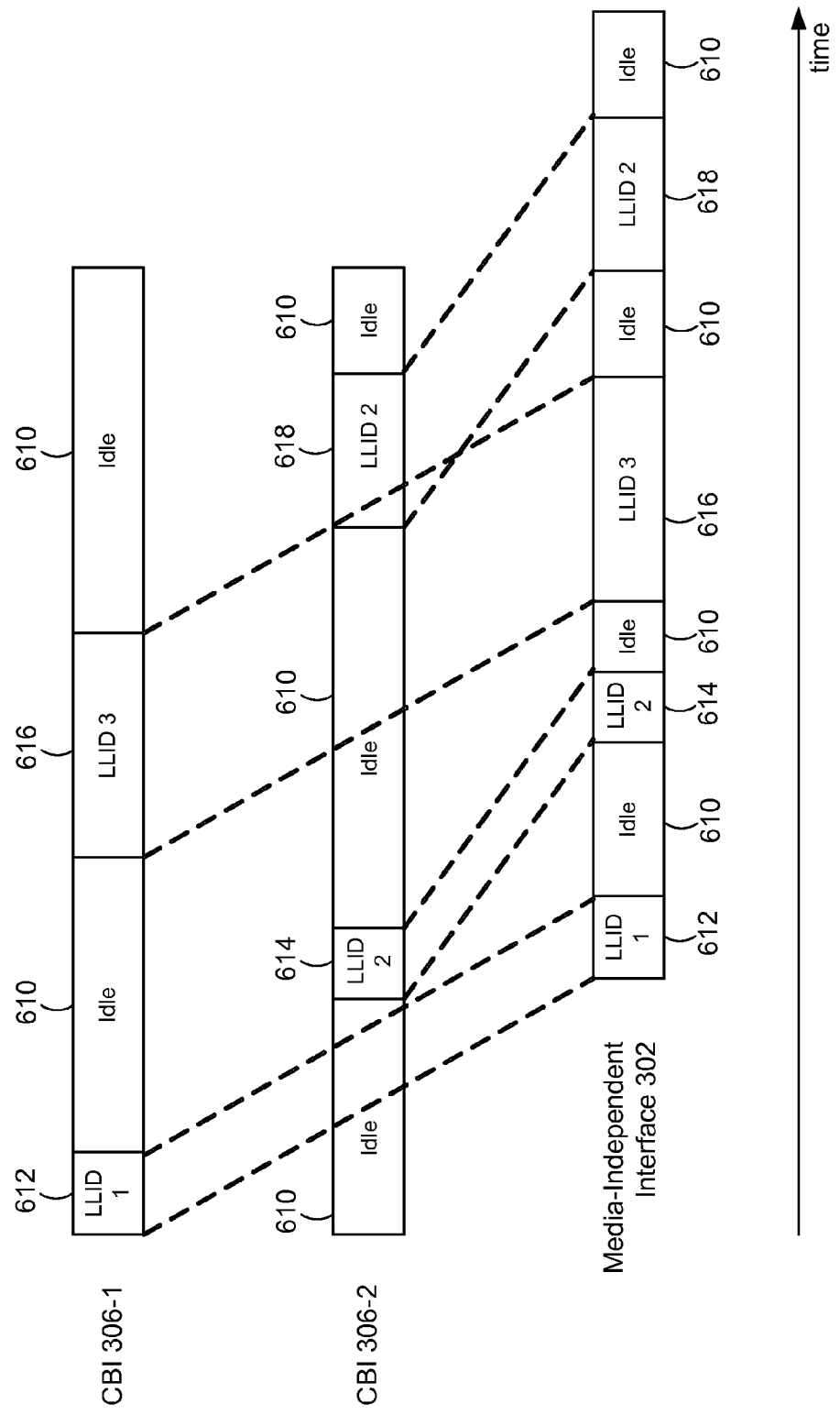
FIG. 6B illustrates a fixed delay through a channel-bonding sublayer for reception in accordance with some embodiments.

FIG. 6B illustrates the (substantially) fixed delay through a CBS 304 for reception of four frames 612, 614, 616, and 618 (as recovered from received signals) in accordance with some embodiments, by illustrating data streams for two CBIs 306-1 and 306-2 and a media-independent interface 302 in the receive direction. Each of the frames 612, 614, 616, and 618 includes an LLID (e.g., embedded in the preamble): LLID 1 for frame 612, LLID 2 for frame 614, LLID 3 for frame 616, and LLID 2 for frame 618. LLIDs 1 and 3 correspond to a channel associated with the first CBI 306-1, while LLID 2 corresponds to a channel associated with the second CBI 306-2. The first CBI 306-1 provides frames 612 and 616 to the CBS 304. The second CBI 306-2 provides frames 614 and 618 to the CBS 304. The CBS 304 transmits the frames 612, 614, 616, and 618 onto the media-independent interface 302. The time between the receipt of each frame 612, 614, 616, and 618 from the first CBI 306-1 or second CBI 306-2 to transmission of each frame 612, 614, 616, and 618 on the media-independent interface 302 is (substantially) fixed, thus showing that the reception delay through the CBS 304 is fixed.

As FIG. 6B shows, the CBIs 306-1 and 306-2 and the media-independent interface 302 send idle characters 610 in the receive direction when no frames are available.

FIG. 6A thus shows a fixed delay through the CBS 304 of a transmitting device (e.g., the CLT 162, or alternatively the CNU 140) and FIG. 6B thus shows a fixed delay through the CBS 304 of a receiving device (e.g., the CNU 140, or alternatively the CLT 162). Furthermore, the delay from transmit PCS 332 to receive PCS 332 may be fixed, resulting in a (substantially) constant delay between the media-independent interface 302 in the transmitter and the media-independent interface 302 in the receiver.

Attention is now directed to broadcasting and multicasting of frames. For each broadcasting and/or multicasting LLID, a group of one or more channels (a "broadcast/multicast channel group") is defined. For example, CBI(s) 306 corresponding to the one or more channels in the group are mapped to the LLID in the channel-bonding table 500 (FIG. 5). Broadcast/multicast packets are transmitted on all of the channels in the broadcast/multicast channel group.

Figure 7A:
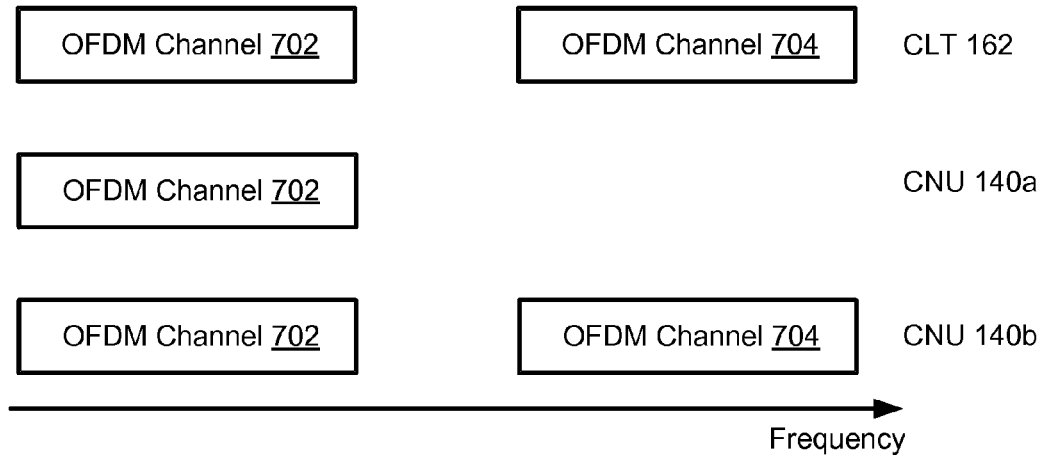
FIGS. 7A-7C illustrate examples of broadcasting or multicasting groups in accordance with some embodiments.

FIG. 7A illustrates an example of a broadcasting or multicasting group that includes two CNUs 140, CNU 140a and CNU 140b. The CNU 140a supports only a first channel 702 (e.g., an OFDM channel, which may be a first one of the channels 202-1, 202-2, and 202-3, FIG. 2A, or 202-6, 202-7, and 202-8, FIG. 2B). The CNU 140b supports the first channel 702 and also supports a second channel 704 (e.g., an OFDM channel, which may be a second one of the channels 202-1, 202-2, and 202-3, FIG. 2A, or 202-6, 202-7, and 202-8, FIG. 2B). A CLT 162 coupled to the CNU 140a and CNU 140b also supports the first channel 702 and the second channel 704. In this example, the first channel 702, but not the second channel 704, is sufficient for broadcasting or multicasting frames to the CNU 140a and CNU 140b, and thus is selected as the broadcast/multicast channel group. In some embodiments, the CLT 162 maps the LLID for this broadcasting or multicasting group to the CBI 306 corresponding to the first channel 702. This mapping is performed, for example, in the channel-bonding table 500 (FIG. 5).

Figure 7B:
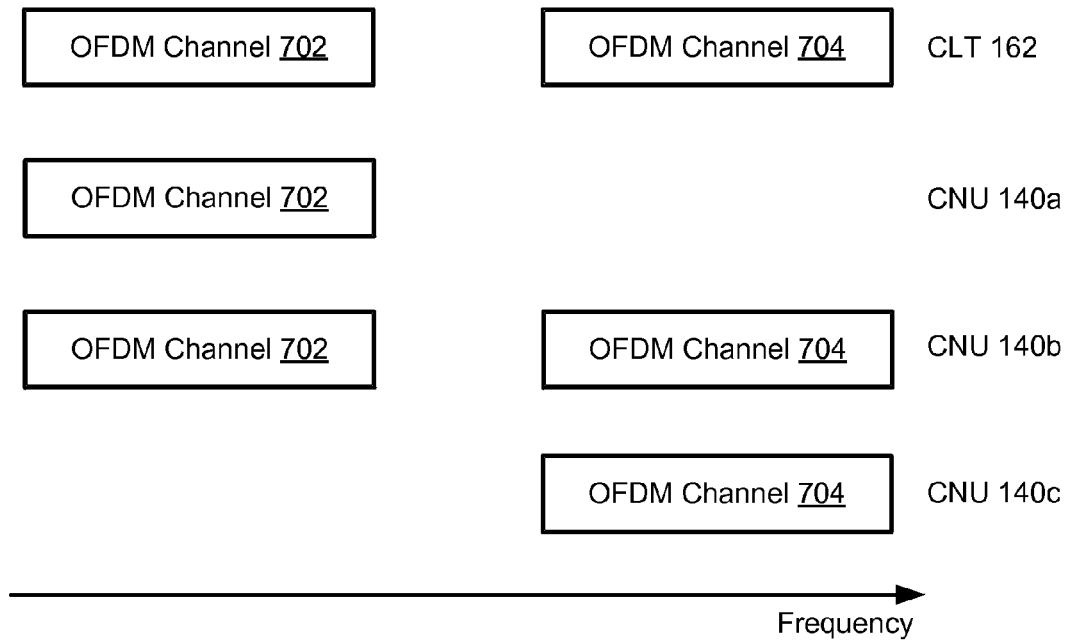

FIG. 7B illustrates an example of a broadcasting or multicasting group that includes three CNUs 140: CNU 140a, CNU 140b, and CNU 140c. CNU 140a supports only the first channel 702, CNU 140b supports both the first channel 702 and the second channel 704, and CNU 140c supports only the second channel 704. A CLT 162 coupled to the CNU 140a, CNU 140b, and CNU 140c supports the first channel 702 and the second channel 704. In this example, neither the first channel 702 nor the second channel 704 is sufficient for broadcasting or multicasting frames to the group. Both the first channel 702 and the second channel 704 are thus included in the broadcast/multicast channel group. In some embodiments, the CLT 162 maps the LLID for this broadcasting or multicasting group to the CBIs 306 corresponding to the first channel 702 and the second channel 704. This mapping is performed, for example, in the channel-bonding table 500 (FIG. 5). When the CBS 304 receives a broadcast or multicast frame with this LLID, it provides a first copy of the frame to the CBI 306 corresponding to the first channel 702 and a second copy of the frame to the CBI 306 corresponding to the second channel 704. The CNU 140b is configured with a primary broadcast/multicast channel list such that either the first channel 702 or the second channel 704 is specified as the primary broadcast/multicast channel to be used to receive broadcast/multicast frames: the CBS 304 in the CNU 140b only forwards broadcast/multicast frames received on the primary broadcast/multicast channel on to the MAC sublayer through the media-independent interface 302. The primary broadcast/multicast channel list may be configured using an MDIO interface.

Figure 7C:
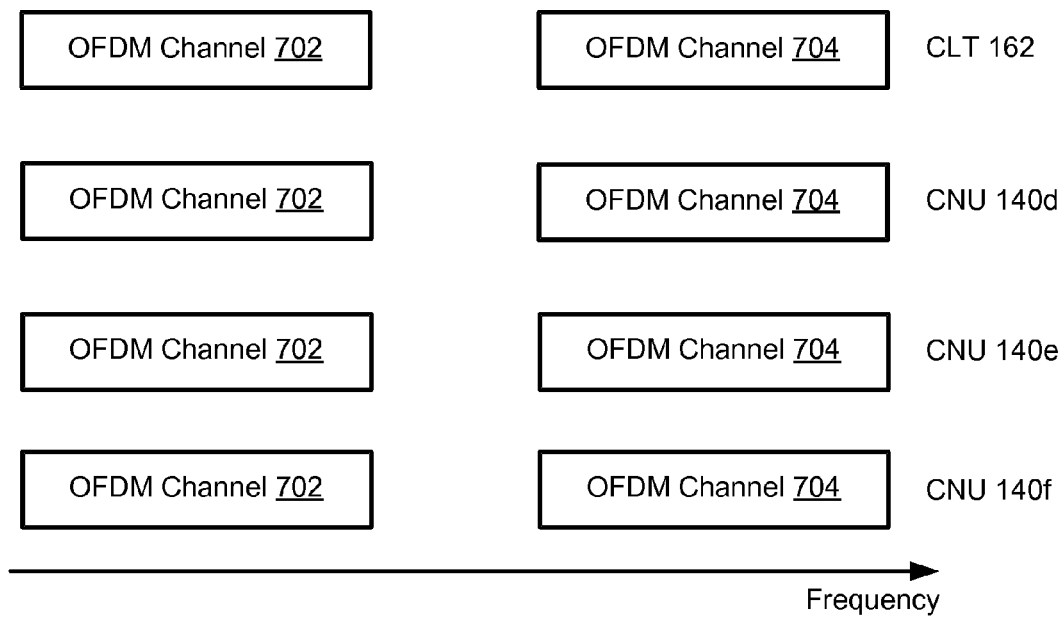

FIG. 7C illustrates another example of a broadcasting or multicasting group that includes three CNUs 140: CNU 140d, CNU 140e, and CNU 140f. All three CNUs 140d, 140e, and 140f support the first channel 702 and the second channel 704. The CLT 162 coupled to the three CNUs 140d, 140e, and 140f also supports the first channel 702 and the second channel 704. Either the first channel 702 or the second channel 704 is thus included in the broadcast/multicast channel group (e.g., as defined in the channel-bonding table 500, FIG. 5).

Attention is now directed to the scheduling of frames for transmission. As described, the network device 800 (FIG. 8) includes a scheduler 810, which may also be referred to as a traffic shaper. The scheduler 810 schedules the sending of frames across the media-independent interface from the MAC 804 to the PHY 300. Because the PHY 300 has a fixed delay, the scheduler 810 effectively schedules transmission of the frames (i.e., of signals generated in the PHY 300 based on the frames) by the PHY 300.

FIG. 9A shows the scheduling of frames for a single channel (channel A), in accordance with some embodiments. FIG. 9A assumes that no frames for other channels are currently available. In some embodiments, the frames of FIG. 9A are Ethernet frames. The media-independent interface 302 has a data rate of $R_x$ and the PHY 300 has a data rate of $R_A$ for channel A, where $R_A$ is less than $R_x$. A PME 308 (FIGS. 3A-3B) corresponding to channel A in the PHY 300 thus has a data rate of $R_A$. To avoid exceeding $R_A$ in the PHY 300, frames are spaced out with a sufficient number of idle characters to account for rate adaption from $R_x$ to $R_A$. For example, a first frame 902 of length n (e.g., n vectors) is sent across the media-independent interface 302 from the MAC 804 to the PHY 300. Before a second frame 906 is sent across the media-independent interface 302, m idle characters 904 (e.g., m idle vectors) are sent across the media-independent interface 302, where m satisfies the relationship:

$$m \geq \left(\frac{R_x}{R_A} - 1\right)n. \quad (1)$$

The value of m represents a period of time (e.g., a number of clock cycles) corresponding to a ratio of $R_x$ to $R_A$. The value of m also represents a period of time (e.g., a number of clock cycles) corresponding to a difference between $R_x$ to $R_A$, since relationship (1) can be rewritten as:

$$m \geq \left(\frac{R_x - R_A}{R_A}\right)n. \quad (2)$$

In some embodiments (e.g., in which the media-independent interface 302 is an XGMII), $R_x$ is 10 Gbps. Relationship (1) then becomes (assuming units of Gbps for $R_A$):

$$m \geq \left(\frac{10}{R_A} - 1\right)n \quad (3)$$

Accordingly, after the first frame 902 is sent across the media-independent interface 302, the scheduler 810 disables the sending of frames for channel A across the media-independent interface 302 for a period of time corresponding to at least the minimum value of m, where m accounts for rate adaption from $R_x$ to $R_A$ (and thus corresponds to a difference between/ratio of $R_x$ and $R_A$). Idle characters 904 are sent instead during this period of time. Once this period of time has ended, the second frame 906 may be sent. The beginning of the second frame 906 as sent across the media-independent interface 302 is thus separated from the beginning of the first frame 902 by a period of time corresponding to the value $$\frac{R_x}{R_A}n \left( \text{e.g., by a number of clock cycles equal to the value } \frac{R_x}{R_A}n \right).$$

In addition to accounting for rate adaption from $R_x$ to $R_A$ in the PHY 300, the idle characters 904 maintain the constant rate $R_x$ on the media-independent interface 302. The PHY 300 (e.g., the PCS 332 for channel A, FIG. 3B) deletes the m idle characters (e.g., idle vectors) 904. The idle characters 904 do not include idle characters (e.g., idle vectors) that are sent across the media-independent interface 302 to save space for FEC parity bits that the PHY 300 (e.g., the FEC sublayer 334, FIG. 3B, for channel A) will insert into the frame 902. The latter idle characters, referred to as FEC idles, are not shown in FIG. 9A for simplicity. FEC idles are sent in addition to the idle characters 904 and thus do not correspond to the period of time during which the sending of frames for channel A is disabled to account for rate adaption (although the FEC idles are still sent before a subsequent frame is sent). The FEC idles associated with the first frame 902 may be considered part of the n vectors of the first frame 902, although in practice they may be sent separately from the first frame 902. FEC idles are also deleted by the PHY 300 (e.g., by the PCS 332 for channel A).

The frames 902 and 906 of FIG. 9A may be selected for channel A based on a determination that they are directed to network devices (e.g., CNUs 140) that use channel A. The network devices (e.g., CNUs 140) to which the frames 902 and 906 are directed may be determined based on identifiers (e.g., LLIDs) in the frames 902 and 906. The selection of channel A for the frames 902 and 906 may be performed by the scheduler 810. For example, the scheduler 810 may include a look-up table that maps LLIDs to channels. A respective LLID may be mapped to a single channel, if the corresponding network device (e.g., CNU 140) uses only the single channel, or to multiple channels, if the corresponding network device (e.g., CNU 140) uses the multiple channels. If an LLID (e.g., for a unicast frame) maps to multiple channels, the scheduler 810 selects one of the multiple channels for the frame.

The scheduling of frames for multiple channels is now described with respect to FIG. 9B. FIG. 9B shows an example of scheduling frames for two channels, channel A (Ch A) and channel B (Ch B), in accordance with some embodiments. As in FIG. 9A, the frames of FIG. 9B may be Ethernet frames. Also as in FIG. 9A, the media-independent interface 302 has a data rate of $R_x$. The PHY 300 has a data rate of $R_A$ for channel A and a data rate of $R_B$ for channel B. $R_A$ and $R_B$ are both less than $R_x$ and may be equal to or different from each other.

To avoid exceeding $R_A$ and $R_B$ in the PHY 300 (e.g., in respective PMEs 308 for channels A and B in the PHY 300, FIGS. 3A-3B), frames for each channel are spaced by a sufficient amount of time to account for rate adaption from $R_x$ to $R_A$ and from $R_x$ to $R_B$, respectively. This spacing may be achieved by separating successive frames for a respective channel with idle characters (e.g., idle vectors) and/or frames for other channels. As for FIG. 9A, this spacing does not account for FEC idles.

For example, a first frame 920 for channel B is sent across the media-independent interface 302 from the MAC 804 to the PHY 300. The first frame 920 has a length n. No subsequent frame for channel B is then sent for at least a period of time 932 (e.g., a number of clock cycles) determined using relationship (1). The sending of frames for channel B across the media-independent interface 302 is thus disabled during the period of time 932. Accordingly, the frame 920 is the only frame for channel B that is sent across the media-independent interface 302 during a period of time 930, which starts when the frame 920 begins to be sent across the media-independent interface 302 and ends when the period of time 932 ends. The period of time 930 has the following duration (e.g., as measured in clock cycles, such as cycles of TX_CLK for the media-independent interface 302):

$$\frac{R_x}{R_B}n \qquad (4)$$

Any frame for channel B that becomes available during the period of time 930 is held until the period of time 930 (and thus the period of time 932) ends and the media-independent interface 302 is free. (The media-independent interface 302 is free when it is not transmitting another frame.) In the example of FIG. 9B, a frame 926 for channel A is being sent across the media-independent interface 302 when the period of time 930 expires. A subsequent frame 928 for channel B is thus held until the frame 926 has been sent, at which point the frame 928 is sent.

While the sending of frames for channel B is disabled, either idle characters, frames for other channels, or a combination thereof are sent across the media-independent interface 302. In the example of FIG. 9B, a frame 922 for channel A, idle characters 924, and another frame 926 for channel A are sent across the media-independent interface 302 while the sending of frames for channel B is disabled. (The period of time 930 ends before sending of the frame 926 is complete, but sending of frames for channel B effectively remains disabled while the sending of frame 926 is completed.)

The frame 922 for channel A has a length of p (e.g., p vectors). After the frame 922 is sent across the media-independent interface 302, the sending of frames for channel A is disabled for a period of time 936, the duration of which may be found by using relationship (1) and substituting p for n. Accordingly, the frame 922 is the only frame for channel A that is sent across the media-independent interface 302 during a period of time 934, which starts when the frame 922 begins to be sent across the media-independent interface 302 and ends when the period of time 936 ends. The period of time 934 has a duration that may be found by using expression (4) and substituting p for n.

In the example of FIG. 9B, p is less than n. The period of time 934 thus ends before the period of time 932, allowing another frame 926 for channel A to be sent before another frame 928 for channel B is sent.

The scheduling described for FIG. 9B may be extended to three or more channels. As described, successive frames for each channel are separated by a period of time determined using relationship (1). For example, a frame for a third channel (i.e., channel C) is sent across the media-independent interface 302, after which the sending of subsequent frames for channel C is disabled for a period of time determined using relationship (1). The frame for the third channel may be sent across the media-independent interface 302 during a period of time that falls within or overlaps periods of time during which no frames for channel A and/or channel B may be sent across the media-independent interface 302.

In some embodiments, indices are used to determine when frames for each channel may be sent across the media-independent interface. A first index $k_A$ is defined for channel A, a second index $k_B$ is defined for channel B, a third index $k_C$ is defined for channel C, and so on. Values of the indices may correspond to values of a time index. Before a frame for a respective channel is sent across the media-independent interface 302, a determination is made as to whether the index for the respective channel satisfies a predefined criterion. For example, the index is compared to a current value of a time index. If the index satisfies the predefined criterion, the frame may be sent (assuming the media-independent interface 302 is free). If the index does not satisfy the predefined criterion, however, then the frame is held until the index subsequently satisfies the predefined criterion.

These indices may originally be set to zero. When a frame for a respective channel is sent across the media-independent interface 302, the value of the respective is index is increased by an amount specified by the expression (4). For example, when the frame 920 for channel B is sent across the media-independent interface 302, $k_B$ is updated to a new value:

$$k_B = k_B + \left(\frac{R_x}{R_B}\right)n \qquad (5)$$

The updated value of $k_B$ indicates the earliest time that a subsequent frame (e.g., frame 928) for channel B may be sent across the media-independent interface 302. The indices thus may be used to disable the sending of frames for respective channels for specified periods of time (e.g., for periods of time 932 and 936, FIG. 9B) to account for rate adaption in the PHY 300.

In some embodiments, counters are used to determine when frames for each channel may be sent across the media-independent interface. A first counter $k_A$ corresponds to channel A, a second counter $k_B$ corresponds to channel B, a third counter $k_C$ corresponds to channel C, and so on. When a frame for a channel is sent across the media-independent interface 302, a value of the counter for the channel is incremented by an amount determined using expression (4). Before a subsequent frame for the channel can be sent across the media-independent interface 302, a determination is made as to whether the counter for the respective channel satisfies a predefined criterion. The subsequent frame for the channel is only sent if the predefined criterion is satisfied. For example, the counters may be decrementing counters that are originally set to zero, and the predefined criterion may specify that a frame for a channel may only be sent across the media-independent interface 302 when the counter for the channel equals zero. In the example of FIG. 9B, when the frame 920 is sent across the media-independent interface, the value of $k_B$ is set to a value:

$$k_B = \left(\frac{R_x}{R_B}\right)n \qquad (6)$$

The value of $k_B$ then decrements by one for each subsequent clock cycle until it reaches zero (at the end of the period of time 930), at which time a subsequent frame for channel B may be sent across the media-independent interface 302 as soon as the media-independent interface 302 is free.

The channels for respective frames may be selected to increase (e.g., optimize) throughput. If a frame is directed to a network device that uses two or more channels, and if the sending of frames for one or more of the two or more channels is currently disabled, then another one of the two or more channels (i.e., a channel for which the sending of frames is not currently disabled) is selected for the frame. In the example of FIG. 9B, the frame 922 may be directed to a network device (e.g., a CNU 140) that uses both channel A and channel B. Channel A is selected for the frame 922, because the sending of frames for channel B is disabled during the period of time 932. Similarly, the frame 926 may be directed to a network device (e.g., a CNU 140) that uses both channel A and channel B. Channel A is selected for the frame 926, because selecting channel B would involve waiting until the period of time 932 ends and would thus delay transmission of the frame 926. However, a low-priority frame may be delayed in favor of transmission of a high-priority frame, even at the cost of reduced overall throughput, in accordance for some embodiments. For example, if the frame 928 were a high-priority frame and the frame 926 were a low-priority frame, then sending of the frame 926 across the media-independent interface 302 might be delayed until after the frame 928 is sent, even though the frame 928 cannot be sent until the periods of time 930 and 932 end.

In some embodiments, the frames 902 and 906 of FIG. 9A and the frames 920, 922, 926, and 928 of FIG. 9B are unicast frames. Alternatively, one or more of the frames 902 and 906 (FIG. 9A) and/or the frames 920, 922, 926, and 928 (FIG. 9B) may be multicast or broadcast frames directed to one or more multicasting or broadcasting groups that use a single channel for the entire group (e.g., as in the examples of FIGS. 7A and 7C). This single channel is selected for a respective broadcast or multicast frame, based on a determination (e.g., using a look-up table in the scheduler 810 that maps LLIDs to channels) that the single channel is sufficient for the group (i.e., that all network devices in the group use the single channel).

If two or more channels are used for broadcasting or multicasting to a particular broadcast or multicast group (e.g., as in the example of FIG. 7B), then the broadcast or multicast frame in question is duplicated, resulting in a copy for each channel. In some embodiments, this duplication is performed by the scheduler 810. For example, the scheduler 810 performs a look-up in a look-up table to identify the two or more channels (e.g., based on an LLID) and generates a copy of the frame for each of the two or more channels. Each copy is sent across the media-independent interface 302, in accordance with the scheduling described for FIG. 9B. Each copy is thus treated as a distinct frame for purposes of scheduling. Alternatively, this duplication is performed by the CBS 304 (FIGS. 3A-3B), and only a single copy of the frame is sent across the media-independent interface 302. The scheduler 810 still disables subsequent sending of frames across the media-independent interface 302 for each of the two or more channels for a specified period of time, to account for rate adaption in the PHY 300 for each of the two or more channels.

Figure 10:
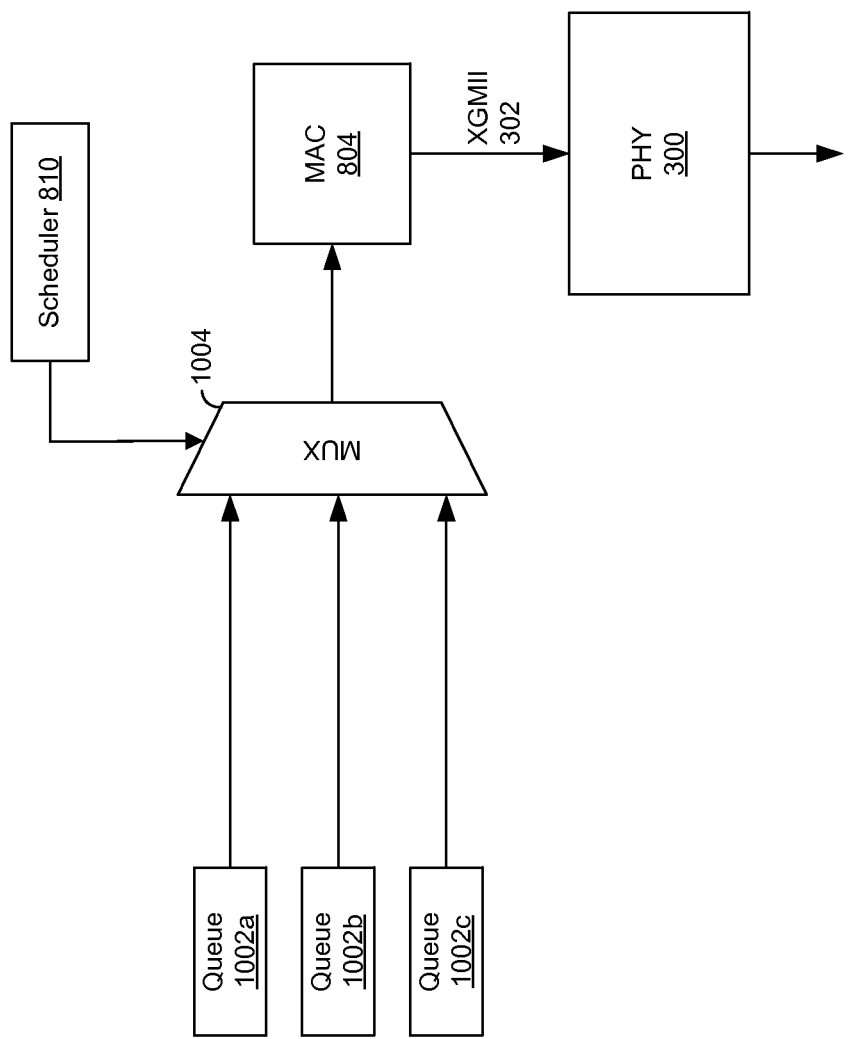
FIG. 10 is a block diagram showing a flow of data associated with scheduling in accordance with some embodiments.

FIG. 10 is a block diagram showing a flow of data associated with the scheduling of FIGS. 9A and 9B in accordance with some embodiments. Data packets are buffered in queues 1002a, 1002b, and 1002c. Each of the queues 1002a, 1002b, and 1002c corresponds to a distinct channel (e.g., to channels A, B, and C, respectively). Each packet is buffered in a queue 1002a, 1002b, or 1002c for the channel that has been selected (e.g., by the scheduler 810) for the corresponding frame. The scheduler 810 controls a multiplexer (mux) 1004 that selectively couples the queues 1002a, 1002b, and 1002c to the MAC 804, in accordance with the scheduling described for FIGS. 9A and 9B. Based on this selective coupling, packets are provided to the MAC 804, which generates corresponding frames and sends these frames over the media-independent interface 302 (e.g., an XGMII) to the PHY 300. The MAC 804 has a fixed delay in accordance with some embodiments, such that the scheduler 810 may achieve the scheduling shown in FIGS. 9A and 9B by appropriately scheduling the provisioning of packets from the queues 1002a, 1002b, and 1002c to the MAC 804.

Figure 11:
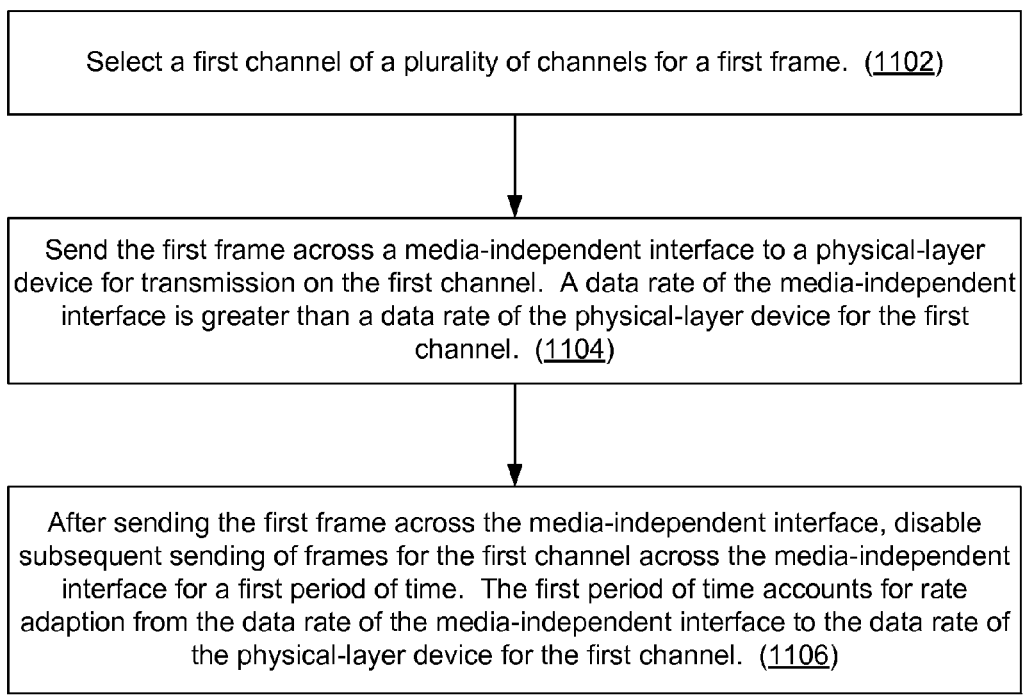
FIG. 11 is a flowchart showing a method of scheduling frames in accordance with some embodiments.

FIG. 11 is a flowchart showing a method 1100 of scheduling frames in accordance with some embodiments. The method 1100 is performed, for example, in the network device 800 (FIG. 8) under the direction of the scheduler 810 (FIG. 8).

In the method 1100, a first channel of a plurality of channels is selected (1102) for a first frame. For example, channel B is selected for the frame 920 (FIG. 9B). In another example, channel A is selected for the frame 922 (FIG. 9B). Examples of the plurality of channels include, but are not limited to, the channels 202-1, 202-2, and 202-3 (FIG. 2A), the channels 202-4 and 202-5 (FIG. 2B), and the channels 202-6, 202-7, and 202-8 (FIG. 2B).

The first frame is sent (1104) across a media-independent interface (e.g., the media-independent interface 302) to a physical-layer device (e.g., the PHY 300, FIG. 3A, such as the PHY 330, FIG. 3B) for transmission on the first channel. A data rate of the media-independent interface is greater than a data rate of the physical-layer device for the first channel.

After sending the first frame across the media-independent interface, subsequent sending of frames for the first channel across the media-independent interface is disabled (1106) for a first period of time. For example, the sending of frames for channel B is disabled for the period of time 932 (FIG. 9B) after the frame 920 is sent. In another example, the sending of frames for channel A is disabled for the period of time 936 (FIG. 9B) after the frame 922 is sent. The first period of time accounts for rate adaption from the data rate of the media-independent interface to the data rate of the physical-layer device for the first channel (e.g., as described above with respect to FIGS. 9A and 9B).

Figure 12:
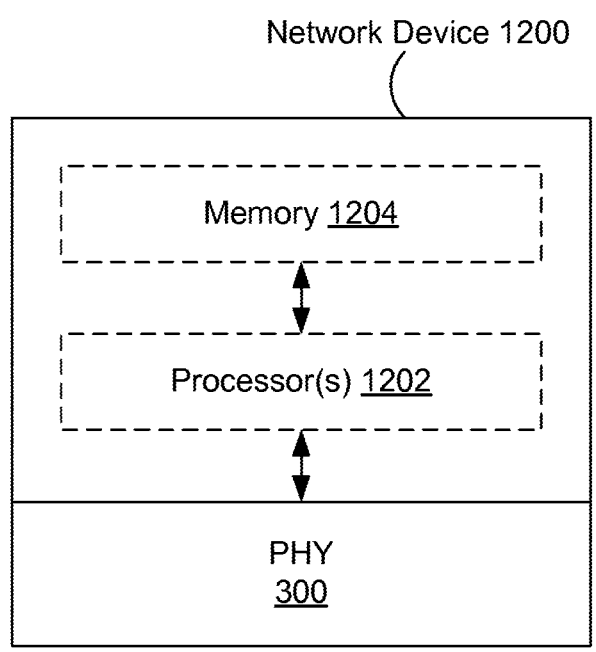
FIG. 12 is a block diagram of a network device in accordance with some embodiments.

FIG. 12 is a block diagram of a network device 1200 (e.g., a CLT 162 or CNU 140, FIGS. 1A-1B and 4) in accordance with some embodiments. The network device 1200 is an example of a network device 800 (FIG. 8). In the network device 800, the PHY 300 (FIG. 3A) is coupled to one or more processors 1202, which are coupled to memory 1204. In some embodiments, the memory 1204 includes a non-transitory computer-readable medium (e.g., one or more nonvolatile memory elements, such as EPROM, EEPROM, Flash memory, a hard disk drive, etc.) that stores instructions for execution by the one or more processors 1202. The instructions include instructions that, when executed by the processor(s) 1202, cause the network device 1200 to implement the functionality of the scheduler 810, MAC client 808, MPCP sublayer 806, MAC 804, and/or RS 802 (FIG. 8). For example, the instructions include instructions that, when executed by the processor(s) 1202, cause the network device 1200 to implement the functionality of the queues 1002a, 1002b, and 1002c; mux 1004; scheduler 810; and/or MAC 804 as described with respect to FIG. 10. The instructions may include instructions that, when executed by the processor(s) 1202, cause the network device 1200 to perform the method 1100 (FIG. 11).

While the memory 1204 is shown as being separate from the processor(s) 1202, all or a portion of the memory 1204 may be embedded in the processor(s) 1202. In some embodiments, the processor(s) 1202 and/or memory 1204 are implemented in the same integrated circuit as the PHY 300.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of scheduling frames, comprising:
   selecting a first channel of a plurality of channels for a first frame;
   sending the first frame across a media-independent interface to a physical-layer device for transmission on the first channel, wherein a data rate of the media-independent interface is greater than a data rate of the physical-layer device for the first channel;
   calculating a first period of time required to compensate for rate adaption from the data rate of the media-independent interface to the data rate of the physical-layer device for the first channel, wherein calculating the first period of time includes calculating a ratio of the data rate of the media-independent interface and the data rate of the physical-layer device, and multiplying the ratio by a length of the first frame;
   after sending the first frame, disabling subsequent sending of frames for the first channel across the media-independent interface for the first period of time; and
   enabling subsequent sending of frames for the first channel across the media-independent interface after the first period of time has elapsed.

2. The method of claim 1, further comprising sending idle characters across the media-independent interface during the first period of time.

3. The method of claim 1, further comprising sending a group of idle characters across the media-independent interface to reserve space for forward-error-correction (FEC) parity bits to be inserted into the first frame by the physical-layer device, wherein the group of idle characters does not correspond to the first period of time.

4. The method of claim 1, further comprising:
   selecting a second channel of the plurality of channels for a second frame; and
   sending the second frame across the media-independent interface to the physical-layer device during a period of time that falls within or overlaps the first period of time, wherein the physical-layer device is to transmit the second frame on the second channel.

5. The method of claim 4, wherein selecting the second channel comprises:
   determining that the second frame is directed to one or more network devices that use both the first channel and the second channel; and
   determining that the sending of frames for the first channel across the media-independent interface is disabled.

6. The method of claim 4, further comprising:
   after sending the second frame across the media-independent interface, disabling subsequent sending of frames for the second channel across the media-independent interface for a second period of time that exceeds a minimum value required to compensate for rate adaption from the data rate of the media-independent interface to the data rate of the physical-layer device for the second channel.

7. The method of claim 6, wherein:
the data rate of the physical-layer device for the second channel is distinct from the data rate of the physical-layer device for the first channel; and
the second period of time has a duration distinct from a duration of the first period of time.

8. The method of claim 6, further comprising:
selecting a third channel of the plurality of channels for a third frame; and
sending the third frame across the media-independent interface to the physical-layer device during a period of time that falls within or overlaps the first period of time and the second period of time, wherein the physical-layer device is to transmit the third frame on the third channel.

9. The method of claim 1, further comprising:
before sending the first frame across the media-independent interface, verifying that an index for the first channel satisfies a predefined criterion based at least in part on rate adaption from the data rate of the media-independent interface to the data rate of the physical-layer device for the first channel;
wherein the disabling comprises adding a value corresponding to the first period of time to the index for the first channel.

10. The method of claim 9, wherein the verifying comprises comparing the index for the first channel to a time index.

11. The method of claim 1, further comprising:
before sending the first frame across the media-independent interface, verifying that a counter for the first channel satisfies a predefined criterion based at least in part on rate adaption from the data rate of the media-independent interface to the data rate of the physical-layer device for the first channel;
wherein the disabling comprises adding a value corresponding to the first period of time to the counter for the first channel.

12. The method of claim 1, wherein the first frame is a unicast frame.

13. The method of claim 1, further comprising:
selecting the first channel of the plurality of channels for the first frame; and
sending the first frame across the media-independent interface to the physical-layer device for transmission on the first channel,
wherein:
the first frame is one of a multicast frame and a broadcast frame directed to one of a multicast group and a broadcast group of network devices, respectively; and
selecting the first channel for the first frame comprises determining that the network devices of the multicast group or broadcast group use the first channel.

14. The method of claim 1, wherein the plurality of channels further comprises a second channel for which a data rate of the physical-layer device is less than the data rate of the media-independent interface, the method further comprising:
duplicating one of a multicast frame and a broadcast frame directed to one of a multicast group and a broadcast group of network devices, respectively, to produce first and second copies of the multicast frame or broadcast frame, wherein a first portion of the multicast group or broadcast group uses the first channel and excludes use of the second channel and wherein a second portion of the multicast group or broadcast group uses the second channel and excludes use of the first channel;
selecting the first channel for the first copy and the second channel for the second copy;
sending the first copy across the media-independent interface to the physical-layer device for transmission on the first channel;
after sending the first copy across the media-independent interface, disabling subsequent sending of frames for the first channel across the media-independent interface for a period of time that exceeds a minimum value required to compensate for rate adaption from the data rate of the media-independent interface to the data rate of the physical-layer device for the first channel;
sending the second copy across the media-independent interface to the physical-layer device for transmission on the second channel; and
after sending the second copy across the media-independent interface, disabling subsequent sending of frames for the second channel across the media-independent interface for a period of time that exceeds a minimum value required to compensate for rate adaption from the data rate of the media-independent interface to the data rate of the physical-layer device for the second channel.

15. The method of claim 14, wherein the second copy is sent across the media-independent interface while the sending of frames for the first channel across the media-independent interface is disabled.

16. A system, comprising:
a physical-layer device to transmit frames on respective channels of a plurality of channels, the physical-layer device having respective data rates for the respective channels;
a media-independent interface to provide the frames to the physical-layer device; and
a scheduler to schedule sending of the frames across the media-independent interface to the physical-layer device, wherein the scheduler is to further:
select a first channel for a first frame;
calculate a first period of time required to compensate for rate adaption from a data rate of the media-independent interface to the data rate of the physical-layer device for the first channel, wherein calculating the first period of time includes calculating a ratio of the data rate of the media-independent interface and the data rate of the physical-layer device, and multiplying the ratio by a length of the first frame;
disable sending of frames for the first channel across the media-independent interface for the first period of time after the first frame for the first channel is sent across the media-independent interface; and
enable subsequent sending of frames for the first channel across the media-independent interface after the first period of time has elapsed.

17. The system of claim 16, wherein:
the scheduler is further to select a second channel of the plurality of channels for a second frame and to schedule sending of the second frame across the media-independent interface to the physical-layer device during a period of time that falls within or overlaps the first period of time, wherein the physical-layer device is to transmit the second frame on the second channel.

18. The system of claim 17, wherein, to select the second channel for the second frame, the scheduler is to determine that the second frame is directed to one or more network devices that use both the first channel and the second channel and to determine that the sending of frames for the first channel across the media-independent interface is disabled.

19. The system of claim 17, wherein the scheduler is further to disable subsequent sending of frames for the second channel across the media-independent interface for a second period of time after sending the second frame across the media-independent interface, wherein the second period of time exceeds a minimum value required to compensate for rate adaption from the data rate of the media-independent interface to the data rate of the physical-layer device for the second channel.

20. The system of claim 16, wherein:
the scheduler comprises a plurality of counters, each corresponding to a respective channel of the plurality of channels; and
the scheduler is to verify that a respective counter satisfies a predefined criterion before scheduling a frame for a channel corresponding to the respective counter to be sent across the media-independent interface to the physical-layer device, wherein the predefined criterion is based at least in part on rate adaption from the data rate of the media-independent interface to the data rate of the physical-layer device for the channel corresponding to the respective counter.

21. A non-transitory computer-readable storage medium storing one or more programs configured for execution by one or more processors, the one or more programs comprising:
instructions to select a first channel of a plurality of channels for a first frame;
instructions to send the first frame across a media-independent interface to a physical-layer device for transmission on the first channel, wherein a data rate of the media-independent interface is greater than a data rate of the physical-layer device for the first channel;
instructions to calculate a first period of time required to compensate for rate adaption from the data rate of the media-independent interface to the data rate of the physical-layer device for the first channel, wherein calculating the first period of time includes calculating a ratio of the data rate of the media-independent interface and the data rate of the physical-layer device, and multiplying the ratio by a length of the first frame;
instructions to disable subsequent sending of frames for the first channel across the media-independent interface for the first period of time after sending the first frame across the media-independent interface;
instructions to enable subsequent sending of frames for the first channel across the media-independent interface after the first period of time has elapsed.

22. The non-transitory computer-readable storage medium of claim 21, wherein the one or more programs further comprise:
instructions to select a second channel of the plurality of channels for a second frame; and
instructions to send the second frame across the media-independent interface to the physical-layer device during a period of time that falls within or overlaps the first period of time, wherein the physical-layer device is to transmit the second frame on the second channel.

23. The non-transitory computer-readable storage medium of claim 22, wherein the instructions to select the second channel for the second frame comprise:
instructions to determine that the second frame is directed to one or more network devices that use both the first channel and the second channel; and
instructions to determine that the sending of frames for the first channel across the media-independent interface is disabled.

24. The non-transitory computer-readable storage medium of claim 22, wherein the one or more programs further comprise:
instructions to disable subsequent sending of frames for the second channel across the media-independent interface for a second period of time after sending the second frame across the media-independent interface, wherein the second period of time exceeds a minimum value required to compensate for rate adaption from the data rate of the media-independent interface to the data rate of the physical-layer device for the second channel.

25. The non-transitory computer-readable storage medium of claim 21, wherein the one or more programs further comprise instructions to verify that a counter for the first channel satisfies a predefined criterion based at least in part on rate adaption from the data rate of the media-independent interface to the data rate of the physical-layer device for the first channel before sending the first frame across the media-independent interface to the physical-layer device.

26. The non-transitory computer-readable storage medium of claim 25, wherein the instructions to disable subsequent sending of frames for the first channel across the media-independent interface for the first period of time comprise instructions to add a value corresponding to the first period of time to the counter for the first channel.

27. A system, comprising:
a first means for transmitting frames on respective channels of a plurality of channels at respective data rates;
a second means for providing the frames to the first means; and
a third means for scheduling sending of the frames across the second means to the first means, the scheduling comprising:
selecting a first channel for a first frames;
calculating a first period of time required to compensate for rate adaption from the data rate of the first means for the first channel to a data rate of the second means, wherein calculating the first period of time includes calculating a ratio of the data rate of the media-independent interface and the data rate of the physical-layer device, and multiplying the ratio by a length of the first frame;
disabling sending of frames for the first channel across the second means for the period of time after the first frame for the first channel is sent across the second means; and
enabling subsequent sending of frames for the first channel across the second means after the first period of time has elapsed.

28. The system of claim 27, wherein:
the third means further comprises means for selecting a second channel of the plurality of channels for a second frame and for scheduling sending of the second frame across the second means to the first means during a period of time that falls within or overlaps the first period of time.

29. The system of claim 28, wherein the means for selecting the second channel for the second frame comprises means for determining that the second frame is directed to one or more network devices that use both the first channel and the second channel and for determining that the sending of frames for the first channel across the second means is disabled.

* * * * *